US012052463B2

United States Patent
Okuike

(10) Patent No.: US 12,052,463 B2
(45) Date of Patent: Jul. 30, 2024

(54) SOLID-STATE IMAGING DEVICE, SOLID-STATE IMAGING METHOD, AND ELECTRONIC EQUIPMENT

(71) Applicant: Sony Semiconductor Solutions Corporation, Kanagawa (JP)

(72) Inventor: Kazuyuki Okuike, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 526 days.

(21) Appl. No.: 17/290,575

(22) PCT Filed: Nov. 22, 2019

(86) PCT No.: PCT/JP2019/045745
§ 371 (c)(1),
(2) Date: Apr. 30, 2021

(87) PCT Pub. No.: WO2020/116197
PCT Pub. Date: Jun. 11, 2020

(65) Prior Publication Data
US 2022/0006952 A1 Jan. 6, 2022

(30) Foreign Application Priority Data
Dec. 7, 2018 (JP) .................................. 2018-229603

(51) Int. Cl.
*H04N 21/44* (2011.01)
*G06F 3/01* (2006.01)
(Continued)

(52) U.S. Cl.
CPC ... *H04N 21/44008* (2013.01); *G06F 18/2413* (2023.01); *G06N 3/08* (2013.01);
(Continued)

(58) Field of Classification Search
CPC ........... H04N 21/44008; H04N 23/611; H04N 21/4751; H04N 21/4666; H04N 1/00838;
(Continued)

(56) References Cited

U.S. PATENT DOCUMENTS 9,946,355 B2 * 4/2018 Choi ....................... G06F 3/017
10,824,865 B2 * 11/2020 Wexler ................... G06F 16/51
(Continued)

FOREIGN PATENT DOCUMENTS

CN 106412357 A 2/2017
CN 107358079 A 11/2017
(Continued)

OTHER PUBLICATIONS

International Search Report (PCT/ISA/210), International Application No. PCT/JP2019/045745, dated Jan. 23, 2020.
(Continued)

*Primary Examiner* — Marly S Camargo
(74) *Attorney, Agent, or Firm* — Michael Best & Friedrich LLP

(57) ABSTRACT

There is provided a solid-state imaging device including an imaging unit (211) configured to capture a first captured image, a storage controlling unit (2332) configured to extract, on a basis of information relating to detection of a first behavior of an imaging target from the first captured image, a first feature amount of the imaging target from the first captured image to have the first feature amount stored into a storage unit, and a transmission controlling unit (2331) configured to control, when a second feature amount coincident with or similar to the first feature amount is extracted from a second captured image captured by the imaging unit, transmission of the second captured image or data based on the second captured image.

19 Claims, 18 Drawing Sheets

(51) Int. Cl.
*G06F 18/2413* (2023.01)
*G06F 21/32* (2013.01)
*G06N 3/08* (2023.01)
*G06V 10/764* (2022.01)
*G06V 10/82* (2022.01)
*G06V 40/16* (2022.01)
*H04L 9/40* (2022.01)
*H04N 23/611* (2023.01)
*H04N 23/80* (2023.01)
*H04N 25/00* (2023.01)

(52) U.S. Cl.
CPC ............ *G06V 10/764* (2022.01); *G06V 10/82* (2022.01); *G06V 40/161* (2022.01); *G06V 40/168* (2022.01); *H04L 63/08* (2013.01); *H04N 23/80* (2023.01); *H04N 23/611* (2023.01); *H04N 25/00* (2023.01)

(58) Field of Classification Search
CPC .. H04N 1/0084; G06V 40/168; G06V 40/161; G06V 10/84; G06V 10/764; G06F 18/2413; G06F 21/32; G06F 3/017; G06N 3/08; H04L 63/08; H04W 12/02
See application file for complete search history.

(56) References Cited

U.S. PATENT DOCUMENTS

| | | | |
|---|---|---|---|
| 2009/0304238 | A1 | 12/2009 | Ebata et al. |
| 2014/0232635 | A1 | 8/2014 | Lee et al. |
| 2015/0381885 | A1 | 12/2015 | Kim et al. |
| 2017/0094357 | A1* | 3/2017 | Park .................. H04N 21/4722 |
| 2017/0192401 | A1 | 7/2017 | Wexler et al. |
| 2017/0223076 | A1 | 8/2017 | Wexler |
| 2018/0007250 | A1 | 1/2018 | Rifkin et al. |

FOREIGN PATENT DOCUMENTS

| | | |
|---|---|---|
| CN | 108038179 A | 5/2018 |
| EP | 3139591 A1 | 3/2017 |
| EP | 3153976 A1 | 4/2017 |
| JP | 2015133624 A | 7/2015 |
| JP | 2016-38621 A | 3/2016 |
| JP | 2017-157936 A | 9/2017 |
| JP | 2018-107538 A | 7/2018 |

OTHER PUBLICATIONS

Notification of Transmittal of the International Search Report and the Written Opinion of the International Searching Authority, or the Declaration (PCT/ISA/220), International Application No. PCT/JP2019/045745, dated Feb. 4, 2020.

Written Opinion of the International Search Authority (PCT/ISA/237), International Application No. PCT/JP2019/045745, dated Feb. 4, 2020.

Extended European Search Report dated Jan. 4, 2022 for corresponding European Application No. 19893741.9.

* cited by examiner

SOLID-STATE IMAGING DEVICE, SOLID-STATE IMAGING METHOD, AND ELECTRONIC EQUIPMENT

TECHNICAL FIELD

The present disclosure relates to a solid-state imaging device, a solid-state imaging method, and electronic equipment.

BACKGROUND ART

In recent years, a technology for enhancing privacy protection of a person imaged by a camera (hereinafter referred to also as an "imaging target") is known. For example, in order to prevent an imaging person from being imaged using a built-in camera of a cellular phone when the imaging person does not intend to do so, a technology for issuing, in the case where the built-in camera is in operation, a notification that the built-in camera is in operation is disclosed (for example, refer to PTL 1).

CITATION LIST

Patent Literature

[PTL 1]
Japanese Patent Laid-Open No. 2015-133624

SUMMARY

Technical Problem

However, it is demanded to provide a technology capable of further enhancing privacy protection of a person imaged by a camera.

Solution to Problem

According to the present disclosure, there is provided a solid-state imaging device including an imaging unit configured to capture a first captured image, a storage controlling unit configured to extract, on a basis of information relating to detection of a first behavior of an imaging target from the first captured image, a first feature amount of the imaging target from the first captured image to have the first feature amount stored into a storage unit, and a transmission controlling unit configured to control, when a second feature amount coincident with or similar to the first feature amount is extracted from a second captured image captured by the imaging unit, transmission of the second captured image or data based on the second captured image.

According to the present disclosure, there is provided a solid-state imaging method including capturing a first captured image, extracting, by a processor, on a basis of information relating to detection of a first behavior of an imaging target from the first captured image, a first feature amount of the imaging target from the first captured image to have the first feature amount stored into a storage unit, and controlling, when a second feature amount coincident with or similar to the first feature amount is extracted from a second captured image, transmission of the second captured image or data based on the second captured image.

According to the present disclosure, there is provided electronic equipment including an application, an imaging unit configured to capture a first captured image, and a transmission controlling unit configured to extract, on a basis of information relating to detection of a first behavior of an imaging target from within a first captured image, a first feature amount of the imaging target from the first captured image to have the first feature amount stored into a storage unit, and configured to control, when a second feature amount coincident with or similar to the first feature amount is extracted from a second captured image captured by the imaging unit, transmission of the second captured image or data based on the second captured image to the application.

DESCRIPTION OF EMBODIMENTS

Figure 1:
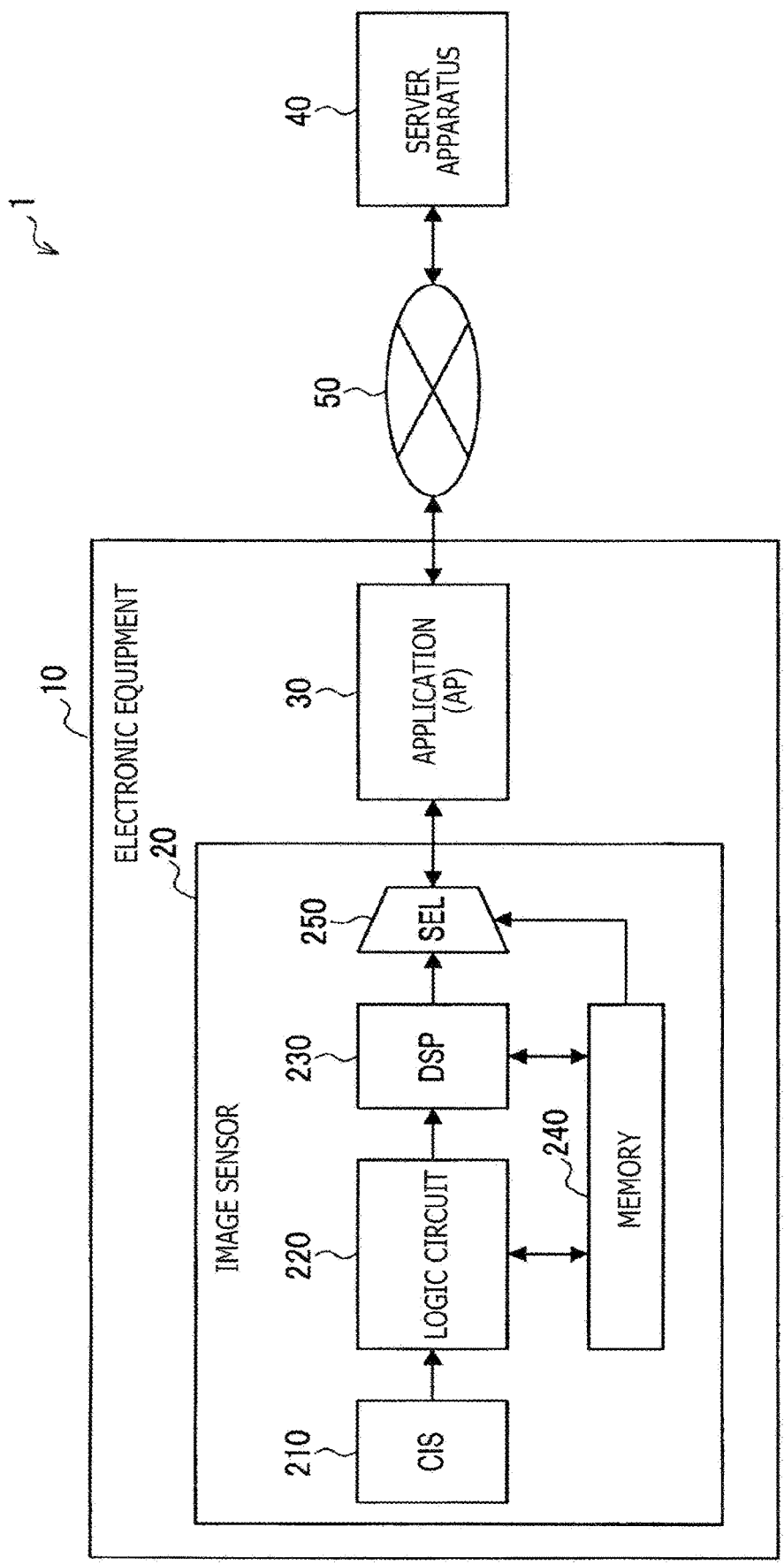
FIG. 1 is a view depicting a configuration example of a solid-state imaging system according to embodiments of the present disclosure.

In the following, preferred embodiments of the present disclosure are described in detail with reference to the drawings. It is to be noted that, in the present specification and the drawings, components having substantially the same functional configurations are denoted by the same reference signs, and overlapping description of them is omitted.

Further, in the present specification and the drawings, multiple components having substantially the same functional configurations are sometimes distinguished from each other by affixing different numerals to the same reference signs. However, in the case where it is not necessary to specifically distinguish multiple components having substantially the same functional configurations from each other, those components are denoted by only the same reference sign. Further, multiple components having the same or similar functional configurations are sometimes distinguished from each other by affixing different alphabetical letters to the same reference sign. However, in the case where there is no necessity to specifically distinguish multiple components having the same or similar functional configurations from each other, those components are denoted by only the same reference sign.

It is to be noted that description is given in the following order.
 0. Overview
 1. Details of Embodiments
  1.1. Configuration Example of System
  1.2. Configuration Example of Image Sensor
  1.3. First Embodiment
  1.4. Second Embodiment
  1.5. Third Embodiment
  1.6. Fourth Embodiment
 2. Conclusion

0. OVERVIEW

In recent years, a technology for enhancing privacy protection of a person imaged by a camera (hereinafter referred to also as an "imaging target") is known. For example, in order to prevent an imaging person from being imaged using a built-in camera of a cellular phone when the imaging person does not intend to do so, a technology for issuing, in the case where the built-in camera is in operation, a notification that the built-in camera is in operation is disclosed. However, it is demanded to provide a technology capable of further enhancing privacy protection of a person imaged by a camera.

More particularly, according to the technology of issuing, in the case where the built-in camera is in operation, a notification that the built-in camera is in operation, there is the possibility that an application can be created by a malignant application creator such that, even if the built-in camera is in operation, the notification to this effect is not issued. Further, according to the technology of issuing, in the case where the built-in camera is in operation, a notification that the built-in camera is in operation, since data obtained by imaging of an imaging target is automatically transmitted to the outside of the image sensor, the privacy protection of the imaging target is not sufficient.

Therefore, in the embodiments of the present disclosure, description is given principally of a technology that can further enhance the privacy protection of an imaging target by controlling transmission of data obtained by imaging of the imaging target to the outside of the image sensor.

The overview of the embodiments of the present disclosure is such as described above.

1. DETAILS OF EMBODIMENTS

1.1. Configuration Example of System

Now, a configuration example of a solid-state imaging system according to embodiments of the present disclosure is described with reference to FIG. 1. Referring to FIG. 1, the solid-state imaging system 1 according to the embodiments of the present disclosure includes electronic equipment 10, a server apparatus 40, and a network 50. The electronic equipment 10 and the server apparatus 40 are communicable with each other through the network 50. It is to be noted that, although the electronic equipment 10 is connected to the network 50 in the example depicted in FIG. 1, multiple pieces of electronic equipment 10 may be connected to the network 50 and each piece of the electronic equipment 10 may be communicable with the server apparatus 40 through the network 50.

The electronic equipment 10 includes an image sensor 20 and an application 30. The image sensor 20 functions as an example of a solid-state imaging device and includes a CIS (Contact Image Sensor) 210, a logic circuit 220, a DSP (Digital Signal Processor) 230, a memory 240, and a selector 250.

Here, the CIS 210 corresponds to an example of an imaging unit and includes an imaging element, a light source, a light receiving lens, an A/D converter, and so forth. The logic circuit 220 includes a signal processing unit that performs signal processing for an output signal from the CIS 210 and so forth. Further, the embodiments of the present disclosure principally assume a case in which the electronic equipment 10 is a camera. However, the electronic equipment 10 is not limited to a camera if it is equipment having the image sensor 20 and may be any other kind of equipment (for example, a smartphone, a cellular phone, and so forth). Meanwhile, the application 30 is executed by a processor built in the electronic equipment 10.

In the embodiments of the present disclosure, a video is captured by the image sensor 20. The video is obtained by the image sensor 20 successively capturing multiple frames (captured images). The embodiments of the present disclosure principally assume a case in which a frame (captured image) captured by the image sensor 20 or data (hereinafter referred to as "metadata") based on the frame (captured image) is transmitted to the server apparatus 40. However, as also hereinafter described, the transmission destination of a captured image or metadata may be the application 30 or may be a recording medium outside the electronic equipment 10.

The configuration example of the solid-state imaging system 1 according to the embodiments of the present disclosure is such as described above.

1.2. Configuration Example of Image Sensor

Figure 2:
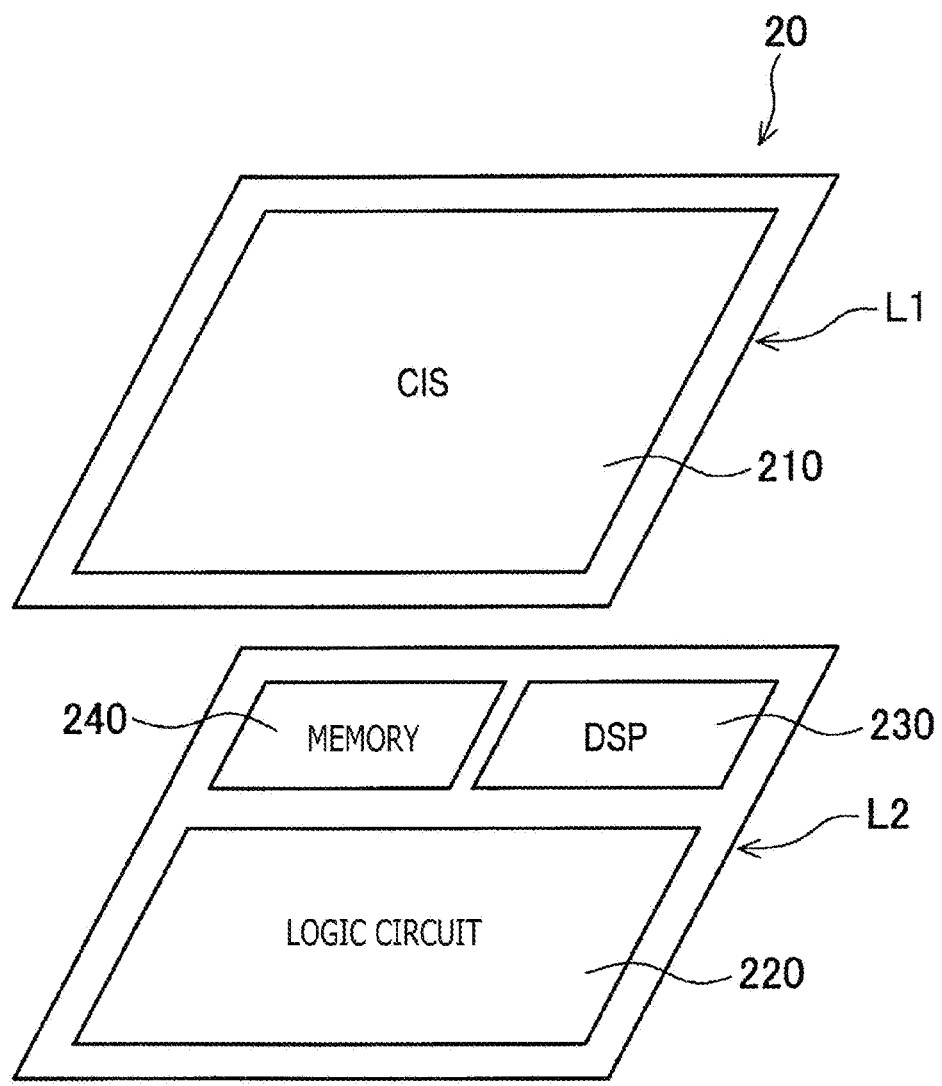
FIG. 2 is a view depicting a first example of a structure of an image sensor.
Figure 3:
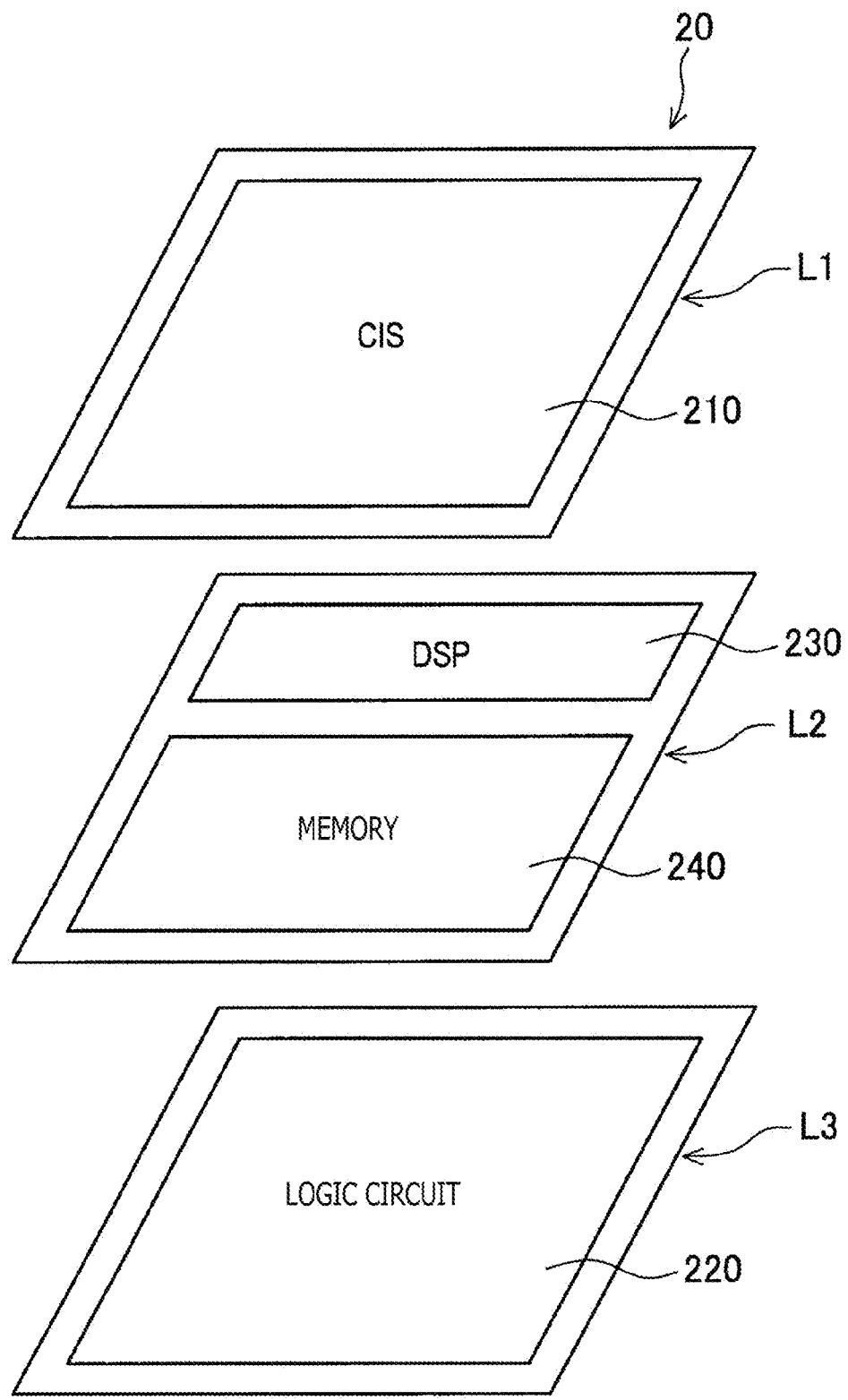
FIG. 3 is a view depicting a second example of the structure of the image sensor.

Subsequently, an example of a structure of the image sensor 20 according to the embodiments of the present disclosure is described. FIG. 2 is a view depicting a first example of the structure of the image sensor 20. FIG. 3 is a view depicting a second example of the structure of the image sensor 20. Referring to FIG. 2, the image sensor 20 includes a first semiconductor chip L1 and a second semiconductor chip L2. Referring to FIG. 3, the image sensor 20 includes a first semiconductor chip 11, a second semiconductor chip 12, and a third semiconductor chip 13.

In such a manner, the image sensor 20 includes multiple semiconductor chips, and the multiple semiconductor chips are configured in a layered manner and are electrically connected to each other. The number of semiconductor chips included in the image sensor 20 is not limited to two and three, and may be one or four or more.

Referring to FIG. 2, the CIS 210 is included in the first semiconductor chip L1. Further, the memory 240, the DSP 230, and the logic circuit 220 are included in the second semiconductor chip L2. Referring to FIG. 3, the CIS 210 is included in the first semiconductor chip L1. Further, the memory 240 and the DSP 230 are included in the second semiconductor chip 12. The logic circuit 220 is included in the third semiconductor chip 13. However, the CIS 210, the memory 240, the DSP 230, and the logic circuit 220 may each be included in any semiconductor chip.

In the examples depicted in FIGS. 2 and 3, a local authentication unit 231 (first authentication unit) hereinafter described may be included in the second semiconductor chip 12. More particularly, the local authentication unit 231 (first authentication unit) may be implemented by the DSP 230 included in the second semiconductor chip L2. A data transmission decision unit 233 hereafter described may also be included in the second semiconductor chip L2. More particularly, the data transmission decision unit 233 may be implemented by the DSP 230 included in the second semiconductor chip 12.

Further, is the example depicted in FIG. 3, a signal processing unit 221 may be included in the logic circuit 220 of the third semiconductor chip 13. As an alternative, in the example depicted in FIG. 2, the signal processing unit 221 may be included in the logic circuit 220 of the second semiconductor chip L2. Further, in the example depicted in FIG. 3, a local authentication data storage unit 232 hereinafter described may be included in the memory 240 of the third semiconductor chip L3. As an alternative, in the example depicted in FIG. 2, the local authentication data storage unit 232 may be included in the memory 240 of the second semiconductor chip 12.

The examples of the structure of the image sensor 20 are such as described above.

1.3. First Embodiment

Figure 4:
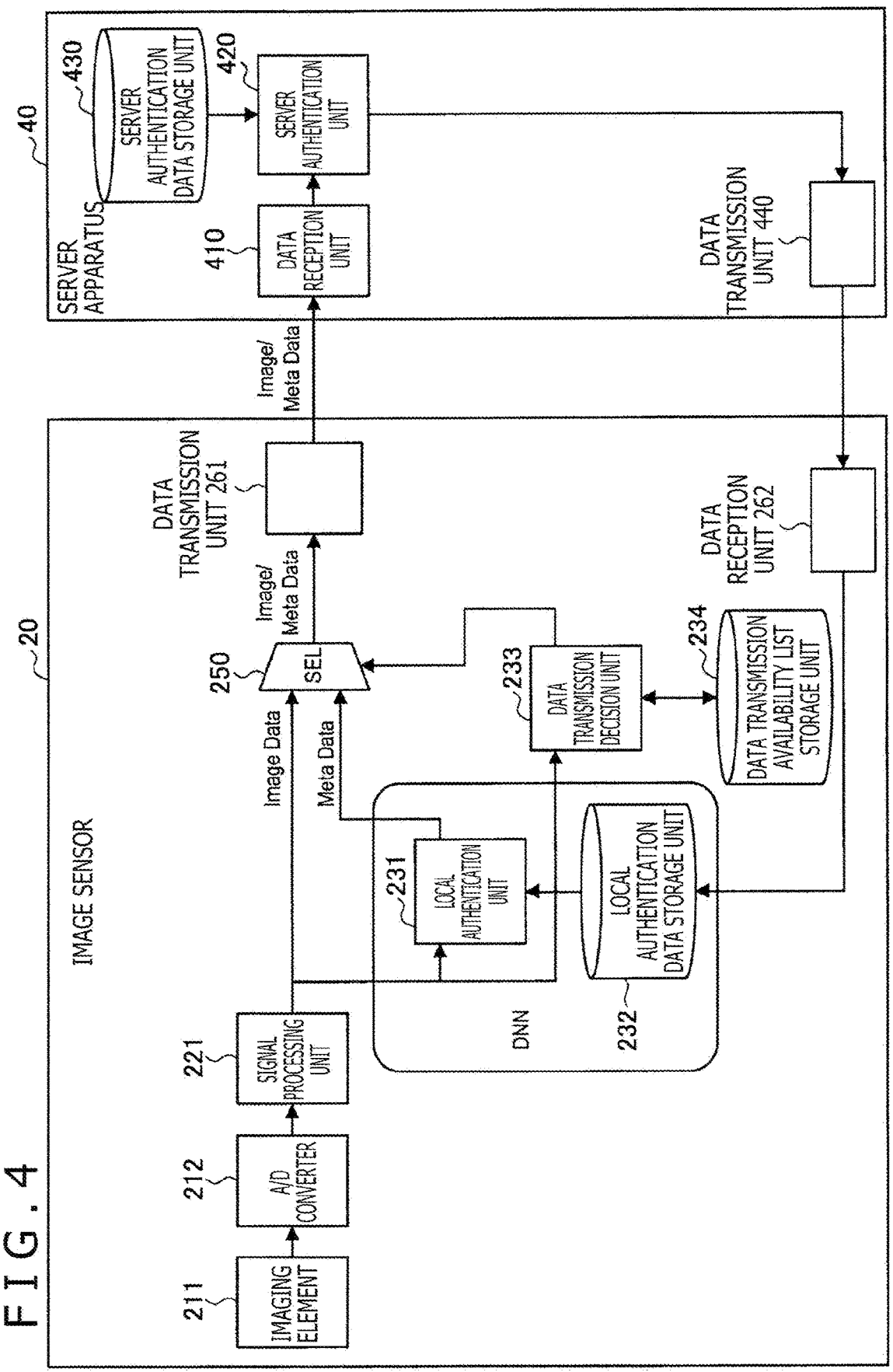
FIG. 4 is a view depicting a detailed configuration example of a solid-state imaging system according to a first embodiment of the present disclosure.

Now, a detailed configuration of a solid-state imaging system 1 according to a first embodiment of the present disclosure is described. FIG. 4 is a view depicting a detailed configuration example of the solid-state imaging system 1 according to the first embodiment of the present disclosure. It is to be noted that, in FIG. 4 and subsequent drawings, the application 30 and the network 50 are omitted for the convenience of illustration. Referring to FIG. 4, the image sensor 20 and the server apparatus 40 are depicted.

The image sensor 20 includes an imaging element 211, an A/D converter 212, the signal processing unit 221, the local authentication unit 231, the local authentication data storage unit 232, the data transmission decision unit 233, a data transmission availability list storage unit 234, the selector 250, a data transmission unit 261, and a data reception unit 262. Meanwhile, the server apparatus 40 includes a data reception unit 410, a server authentication unit (second authentication unit) 420, a server authentication data storage unit 430, and a data transmission unit 440.

The imaging element 211 converts a light signal of light received from an imaging target into an electric signal. The A/D converter 212 converts the electric signal from an analog signal into a digital signal and outputs the digital signal. The signal processing unit 221 performs various kinds of signal processing for an output signal (captured image) from the A/D converter 212 and outputs a signal (captured image) after the processing. Here, an example of the signal processing performed by the signal processing unit 221 is described. However, all of the signal processing described below may not necessarily be performed by the signal processing unit 221, and only part of the signal processing may be performed by the signal processing unit 221 or processing different from the signal processing may be performed by the signal processing unit 221.

Figure 5:
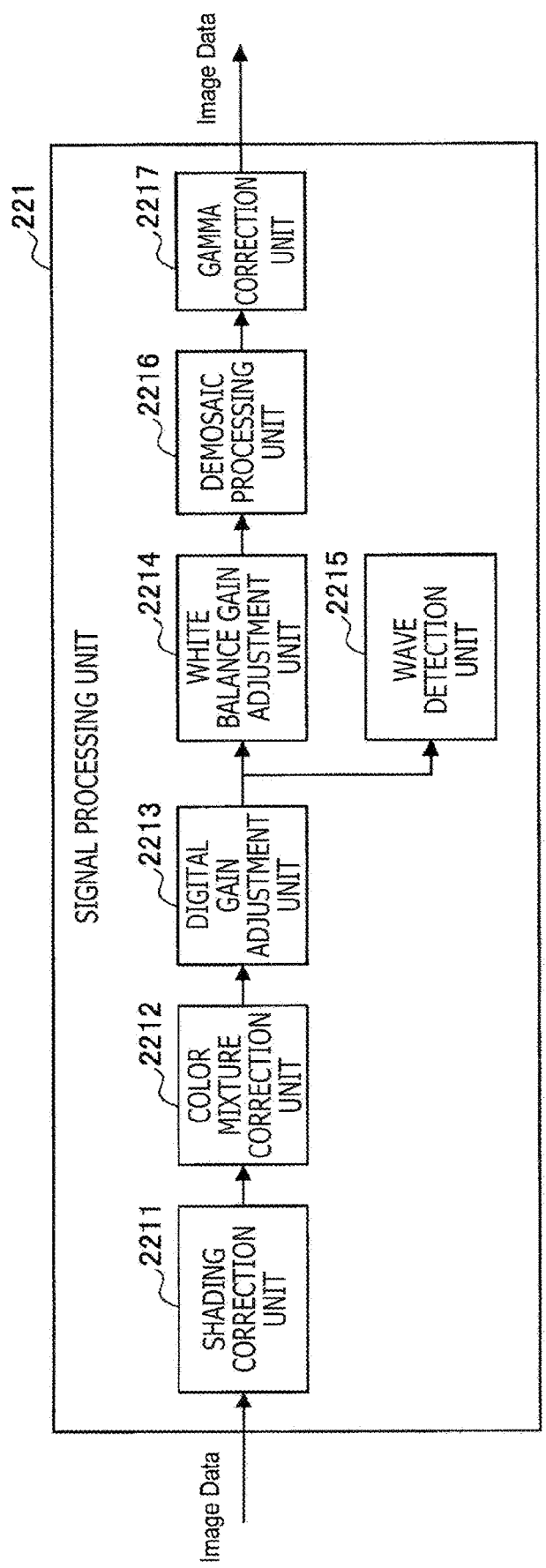
FIG. 5 is a view depicting a detailed configuration example of a signal processing unit.

FIG. 5 is a view depicting a detailed configuration example of the signal processing unit 221. As depicted in FIG. 5, the signal processing unit 221 may include a shading correction unit 2211 that performs shading correction, a color mixture correction unit 2212 that performs color mixture correction, and a digital gain adjustment unit 2213 that performs digital gain adjustment. Further, the signal processing unit 221 may include a white balance gain adjustment unit 2214 that adjusts a white balance gain, a wave detection unit 2215 that performs wave detection, a demosaic processing unit 2216 that performs demosaic processing, and a gamma correction unit 2217 that performs gamma correction.

Figure 6:
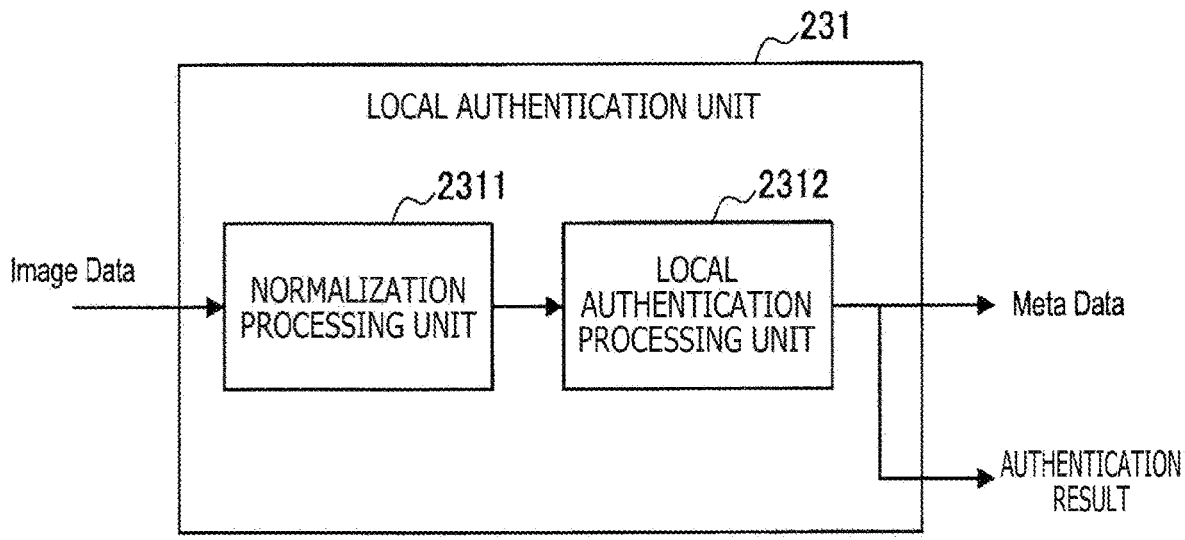
FIG. 6 is a view depicting a detailed configuration example of a local authentication unit.

Description is continued referring back to FIG. 4. The signal (captured image) after the processing by the signal processing unit 221 is outputted to the selector 250, the data transmission decision unit 233, and the local authentication unit 231. First, a detailed configuration example of the local authentication unit 231 is described. FIG. 6 is a view depicting a detailed configuration example of the local authentication unit 231. As depicted in FIG. 6, the local authentication unit 231 includes a normalization processing unit 2311 and a local authentication processing unit 2312.

The normalization processing unit 2311 performs preprocessing necessary for processing by the local authentication processing unit 2312 (for example, a neural network). For example, the preprocessing may be range adjustment, size adjustment, and so forth of a second captured image. The local authentication processing unit 2312 performs first authentication on the basis of the second captured image in the case where a second feature amount coincident with or similar to a first feature amount is extracted from the second captured image. For example, data obtained by the first authentication may be data (metadata) based on the second captured image. Such metadata may be identification information of the imaging target (person) identified from the second captured image.

It is to be noted that the local authentication unit 231 may include a neural network that has undergone machine learning (first neural network). It is supposed that this increases authentication accuracy. For example, the neural network may be a deep learning network. In such a case as just described, it is supposed that the authentication accuracy is further increased. However, the first authentication by the local authentication unit 231 may be performed by a configuration that does not require learning. An authentication result (success/failure) of the first authentication and data (metadata) obtained by the first authentication are outputted to the selector 250.

Figure 7:
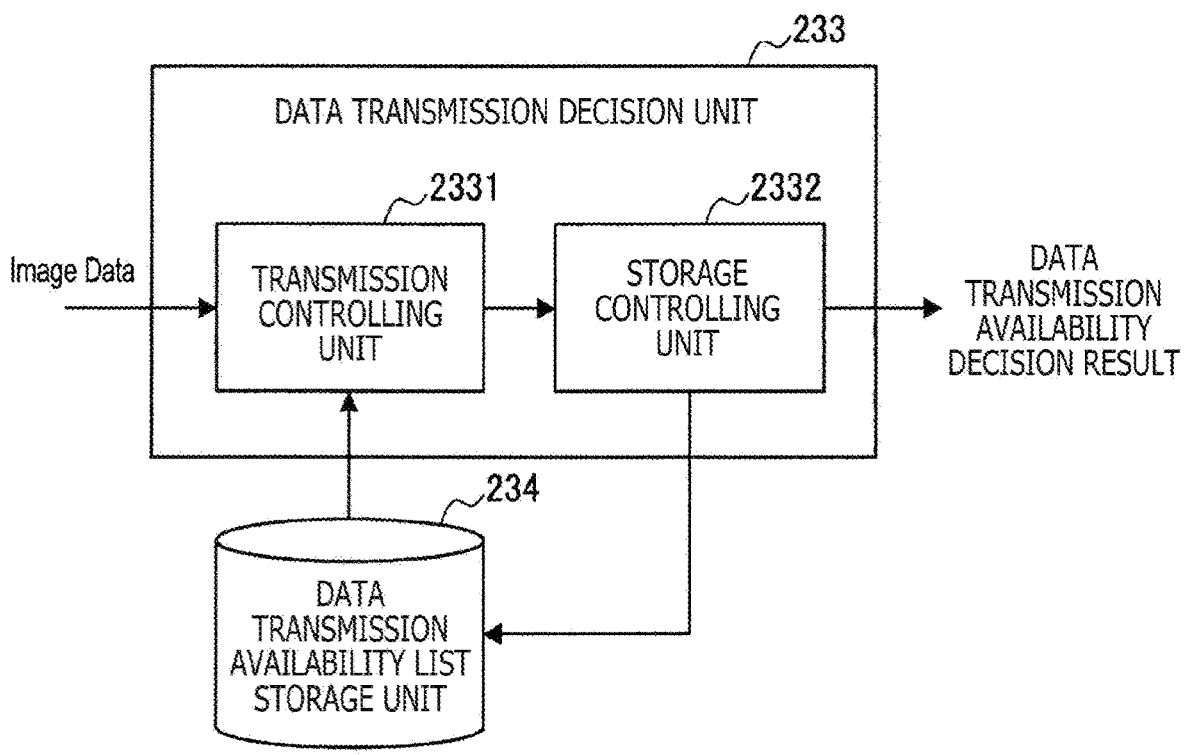
FIG. 7 is a view depicting a detailed configuration example of a data transmission decision unit.

Now, a detailed configuration example of the data transmission decision unit 233 is described. FIG. 7 is a view depicting a detailed configuration example of the data transmission decision unit 233. As depicted in FIG. 7, the data transmission decision unit 233 includes a transmission controlling unit 2331 and a storage controlling unit 2332.

The embodiments of the present disclosure principally assume a case in which the data transmission decision unit 233 performs processing for each frame (captured image) of a video inputted from the signal processing unit 221. However, the target of processing by the data transmission decision unit 233 is not limited to each frame (captured image) of the video inputted from the signal processing unit 221 but may be each set of multiple frames. Here, a frame inputted to the data transmission decision unit 233 at a certain timing is referred to as a "first captured image," and a frame inputted to the data transmission decision unit 233 later than the first captured image is referred to as a "second captured image."

First, a first captured image captured by the imaging element 211 is inputted to the data transmission decision unit 233. The storage controlling unit 2332 extracts a first feature amount of an imaging target from within the first captured image on the basis of information relating to detection of a first behavior of the imaging target from the first captured image. The storage controlling unit 2332 has the extracted first feature amount stored into the data transmission availability list storage unit 234.

Then, a second captured image captured by the imaging element 211 is inputted to the data transmission decision unit 233. The transmission controlling unit 2331 tries to find whether a second feature amount coincident with or similar to the first feature amount is extracted from the second captured image. In the case where a second feature amount coincident with or similar to the first feature amount is extracted from the second captured image, the transmission controlling unit 2331 controls transmission of the second captured image or data (metadata) based on the second captured image to the server apparatus 40. It is to be noted that it is sufficient if the transmission controlling unit 2331 controls which one of the second captured image or the metadata based on the second captured image is to be outputted from the selector 250, so that either one of them is transmitted to the server apparatus 40.

According to such a configuration as described above, it is possible to control transmission of a second captured image obtained by imaging of an imaging target or metadata of the second captured image to the outside of the image sensor 20. This makes it possible to further enhance the privacy protection of the imaging target.

For example, it is sufficient if, in the case where the first authentication by the local authentication unit 231 results in success, the transmission controlling unit 2331 controls transmission of data (metadata) based on the second captured image to the server apparatus 40. On the other hand, it is sufficient that, in the case where the first authentication by the local authentication unit 231 results in failure, the transmission controlling unit 2331 controls transmission of the second captured image to the server apparatus 40.

The first behavior is not restrictive. For example, a case is supposed in which an imaging target performs a certain gesture (positive gesture) when the imaging target permits imaging of the imaging target itself. In such a case as just described, the positive gesture can correspond to the first behavior. In this case, when the first behavior is detected from the first captured image, the storage controlling unit 2332 extracts the first feature amount to have the first feature amount stored into the data transmission availability list storage unit 234. However, as also hereinafter described, the first behavior may be a gesture (negative gesture) performed when the imaging target prohibits imaging of the imaging target itself.

The first feature amount and the second feature amount may be extracted using a neural network that has undergone machine learning (third neural network). It is supposed that this increases accuracy in extracting the feature amounts.

For example, the neural network may be a deep learning network. In such a case as just described, it is supposed that the accuracy in extracting the feature amounts is further increased. However, the first feature amount and the second feature amount may be extracted by a configuration that does not require learning. It is to be noted that the neural network that has undergone machine learning (third neural network) can be included in the data transmission decision unit 233.

The second captured image or the data (metadata) based on the second captured image is transmitted to the server apparatus 40 by the data transmission unit 261 under the control of the data transmission decision unit 233. In the server apparatus 40, the second captured image or the data (metadata) based on the second captured image is received by the data reception unit 410. The server authentication unit 420 performs second authentication based on the second captured image. For example, data obtained by the second authentication may be the data (metadata) based on the second captured image. Such metadata may be identification information of the imaging target (person) identified from the second captured image.

It is to be noted that the server authentication unit 420 may include a neural network that has undergone machine learning (second neural network). It is supposed that this increases the authentication accuracy. For example, the neural network may be a deep learning network. In such a case as just described, it is supposed that the authentication accuracy is further increased. However, the second authentication by the server authentication unit 420 may be performed by a configuration that does not require learning. An authentication result (success/failure) of the second authentication and data (metadata) obtained by the second authentication are transmitted to the image sensor 20 through the data transmission unit 440.

In the image sensor 20, the authentication result (success/failure) of the second authentication and the data (metadata) obtained by the second authentication are received by the data reception unit 262.

In the case where the first authentication results in success, processing based on the data (metadata) obtained by the first authentication is performed by the image sensor 20. Also in the case where the second authentication results in success, processing based on the data (metadata) obtained by the second authentication is performed by the image sensor 20. The processing based on the metadata is not restrictive. For example, in the case where the metadata is identification information of an imaging target, the processing based on the metadata may be processing for displaying an avatar corresponding to the imaging target identified based on the identification information on a screen.

It is to be noted that there is the possibility that a second parameter of the second neural network included in the server authentication unit 420 may contribute more to high recognition accuracy than a first parameter of the first neural network included in the local authentication unit 231. As a parameter, a weight, a bias, or the like is supposed. Therefore, it is desirable to update the first parameter of the first neural network included in the local authentication unit 231 at a predetermined timing on the basis of the second parameter of the second neural network included in the server authentication unit 420.

In particular, in the case where the second authentication based on the second captured image by the server authentication unit 420 results in success, the second parameter of the second neural network included in the server authentication unit 420 may be acquired from the server authentication data storage unit 430 by the server authentication unit 420 and transmitted to the image sensor 20 through the data transmission unit 440. At this time, in the image sensor 20, the second parameter is received by the data reception unit 262, and the first parameter, which is stored in the local authentication data storage unit 232, of the first neural network included in the local authentication unit 231 may be updated on the basis of the second parameter by the local authentication unit 231.

Figure 8:
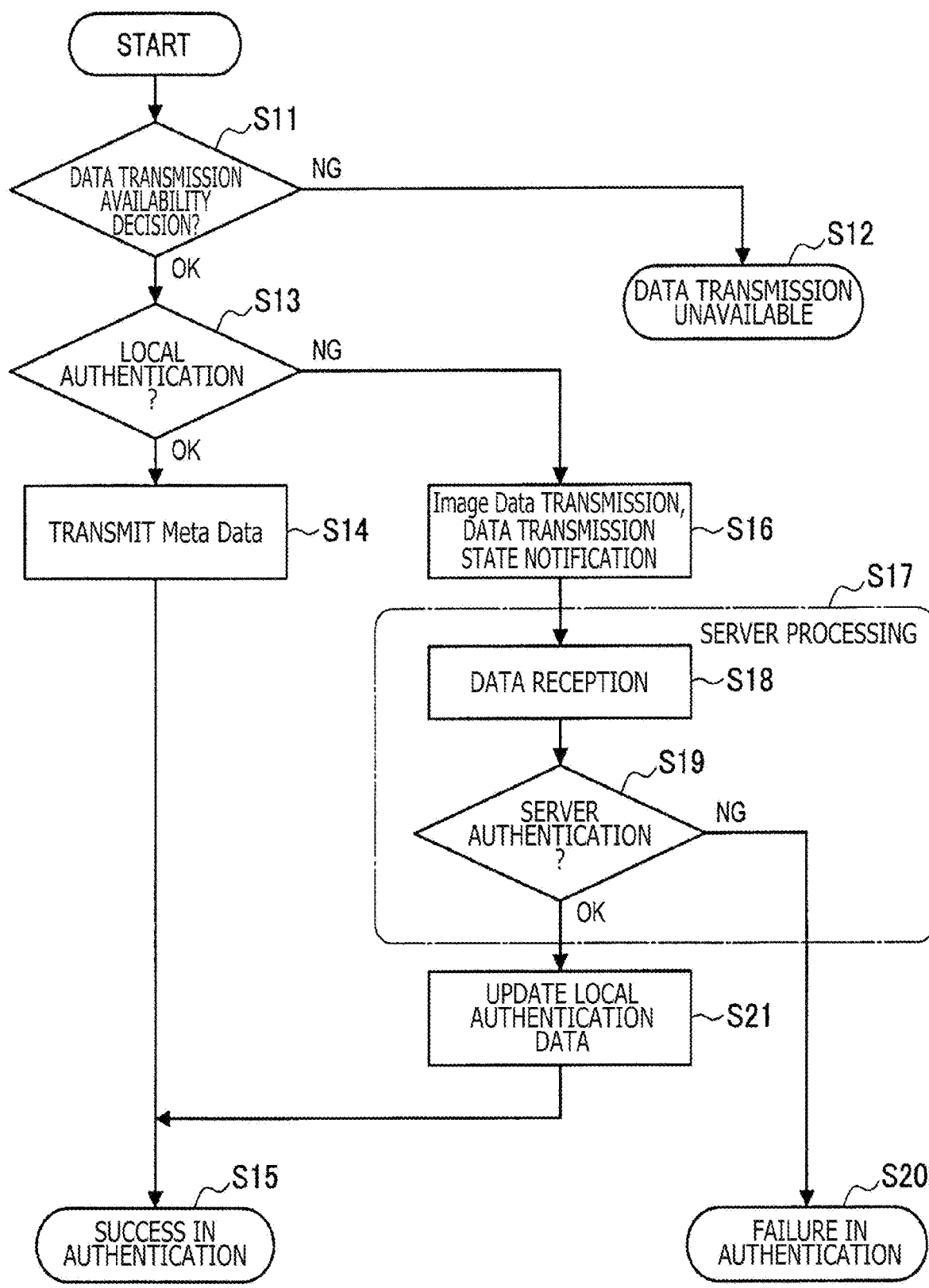
FIG. 8 is a flow chart depicting an operation example of an image sensor according to the first embodiment of the present disclosure.

Subsequently, an operation example of the image sensor 20 according to the first embodiment of the present disclosure is described. FIG. 8 is a flow chart depicting the operation example of the image sensor 20 according to the first embodiment of the present disclosure. As depicted in FIG. 8, the data transmission decision unit 233 decides data transmission availability (S11). The data transmission availability decision is described in detail with reference to FIG. 9.

Figure 9:
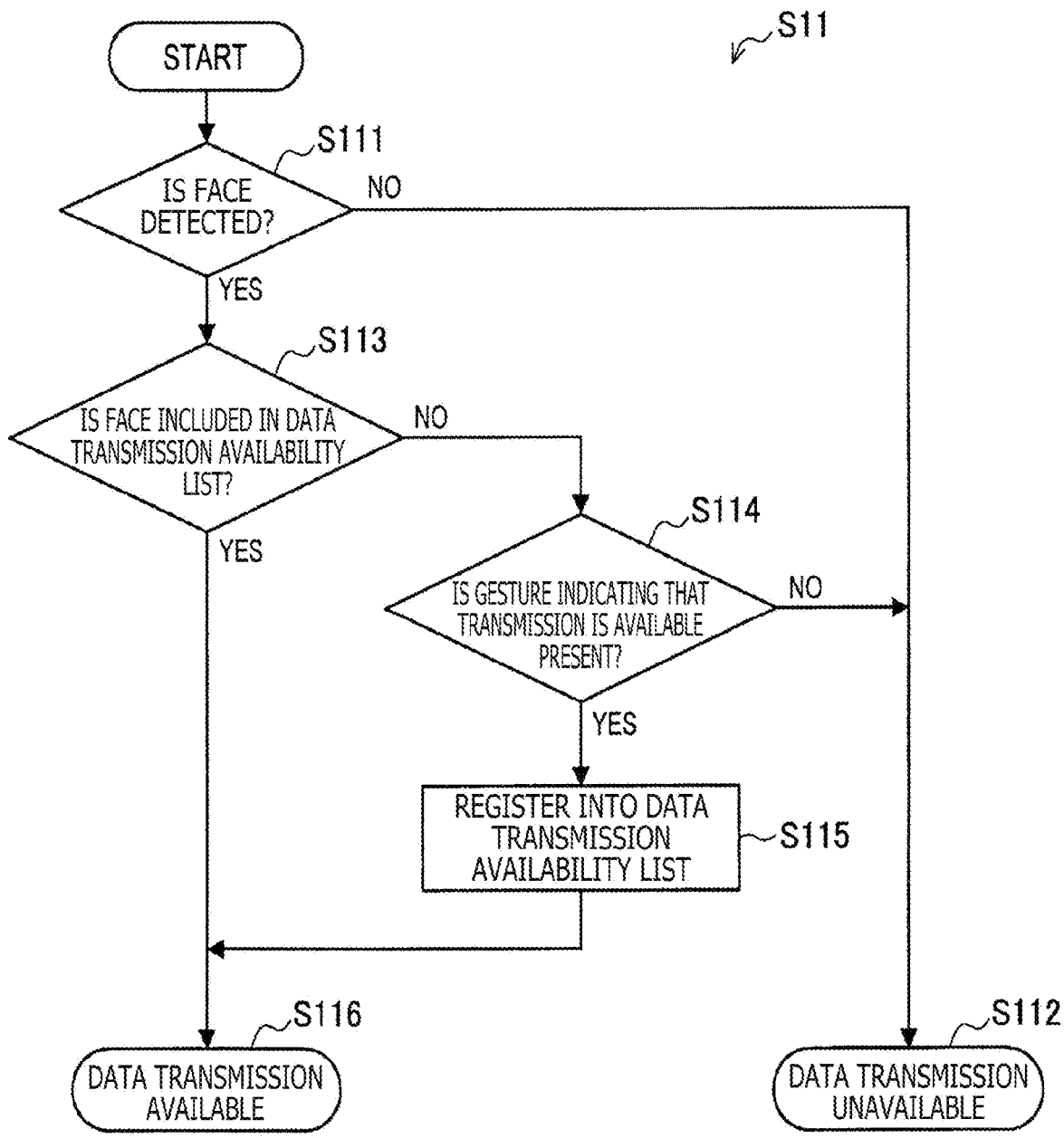
FIG. 9 is a flow chart depicting a detailed operation example of data transmission availability decision according to the embodiment.

FIG. 9 is a flow chart depicting a detailed operation example of the data transmission availability decision according to the first embodiment of the present disclosure. As depicted in FIG. 9, in a data transmission availability decision S11, the data transmission decision unit 233 tries to detect a face (feature amount of a face) from a captured image inputted thereto (S111). It is to be noted that another feature amount of the imaging target may be used in place of the feature amount of the face. In the case where the face (feature amount of the face) is not detected ("NO" at S111), the data transmission decision unit 233 decides that data transmission is unavailable (S112). On the other hand, in the case where the face is detected ("YES" at S111), the data transmission decision unit 233 decides whether or not the detected face is a face included in a data transmission availability list (S113).

In the case where the detected face is a face that is included in the data transmission availability list ("YES" at step S113), the data transmission decision unit 233 decides that data transmission is available (S116). On the other hand, in the case where the detected face is a face that is not included in the data transmission permission list ("NO" at S113), the data transmission decision unit 233 decides whether or not the inputted captured image includes a gesture indicating that transmission is available (S114). The gesture indicating that transmission is available corresponds to an example of the positive gesture described hereinabove.

Figure 10:
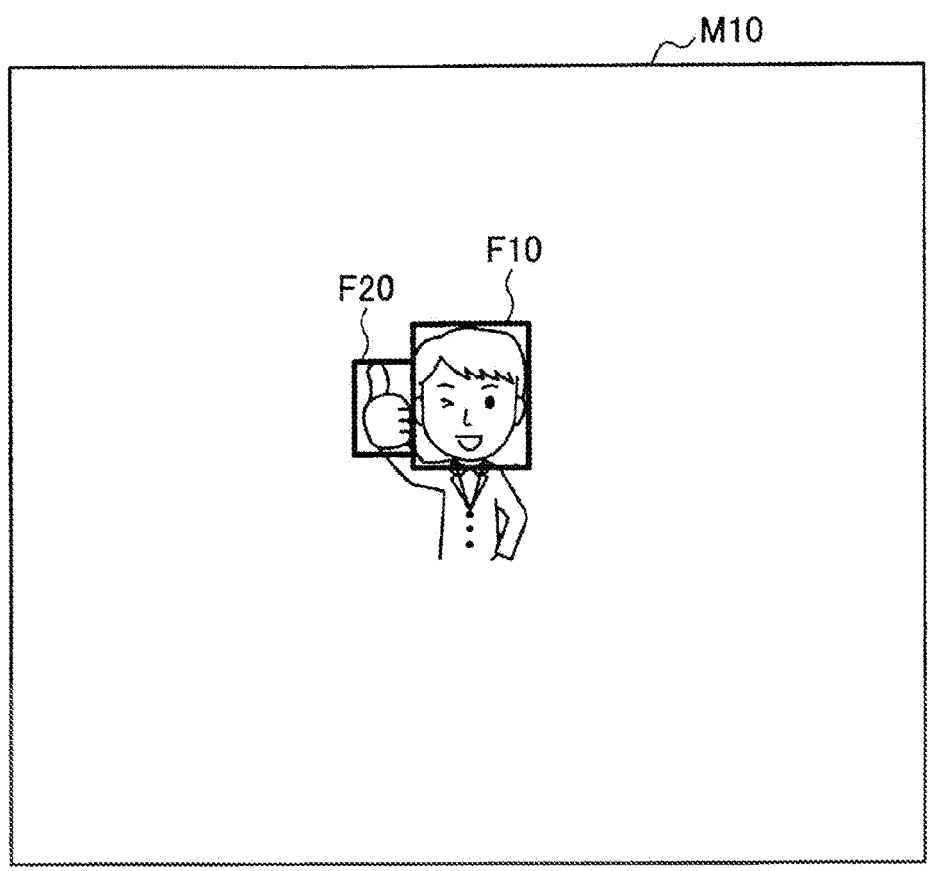
FIG. 10 is a view depicting an example of a gesture indicating that transmission is available.

FIG. 10 is a view depicting an example of a gesture indicating that transmission is available. Referring to FIG. 10, an inputted captured image M10 is depicted. In the captured image M10, a face F10 and a gesture F20 indicating that transmission is available are imaged. In such a case as just described, the face F10 is detected from the captured image M10, and in the case where the face F10 is not found in the data transmission availability list, it is decided that the gesture F20 indicating that transmission is available is present from the captured image M10. It is to be noted that, although FIG. 10 indicates a gesture of thumbing up as an example of the gesture F20 indicating that transmission is available, the gesture F20 indicating that transmission is available is not limited to such an example.

Description is continued referring back to FIG. 9. In the case where the data transmission decision unit 233 decides that the inputted captured image does not include a gesture indicating that transmission is available ("NO" at S114), the data transmission decision unit 233 decides that data transmission is unavailable (S112). On the other hand, in the case where the data transmission decision unit 233 decides that the inputted captured image includes a gesture indicating that transmission is available ("YES" at S114), the data transmission decision unit 233 registers the detected face (feature amount of the face) into the data transmission availability list (S115) and decides that data transmission is available (S116).

Description is continued referring back to FIG. 8. In the case where it is decided that data transmission is unavailable ("NG" at S11), data transmission is unavailable (S12). On the other hand, in the case where it is decided that data transmission is available ("OK" at S11), the local authentication unit 231 performs local authentication (S13). The local authentication can correspond to the first authentication described above. In the case where the local authentication results in success ("OK" at S13), the metadata is transmitted to the server apparatus 40 by the data transmission unit 261 (S14), resulting in success in authentication (S15). On the other hand, in the case where the local authentication results in failure ("NG" at S13), the captured image is transmitted to the server apparatus 40 by the data transmission unit 261. At this time, a notification representing a data transmission state may be issued (S16).

Then, server processing by the server apparatus 40 is performed (S17). In particular, the captured image is received by the data transmission unit 440 (S18), and server authentication is performed on the basis of the captured image (S19). The server authentication can correspond to the second authentication described above. In the case where the server authentication results in success ("OK" at S19), the local authentication data is updated with the server authentication data (S21), resulting in success in authentication (S15). On the other hand, in the case where the server authentication results in failure ("NG" at S19), the authentication results in failure (S20).

Subsequently, a modification 1 of the first embodiment of the present disclosure is described. The foregoing description indicates an example in which, in the case where a second feature amount coincident with or similar to a first feature amount is extracted from the second captured image, the transmission controlling unit 2331 controls transmission of the second captured image or the data (metadata) based on the second captured image to the server apparatus 40 without any specific restriction. However, in the case where an elapsed time period after the first feature amount is stored into the data transmission availability list storage unit 234 exceeds a predetermined time period, the transmission controlling unit 2331 may stop the transmission of the second captured image or the data based on the second captured image. It is expected that this further enhances the privacy protection of the imaging target.

Figure 11:
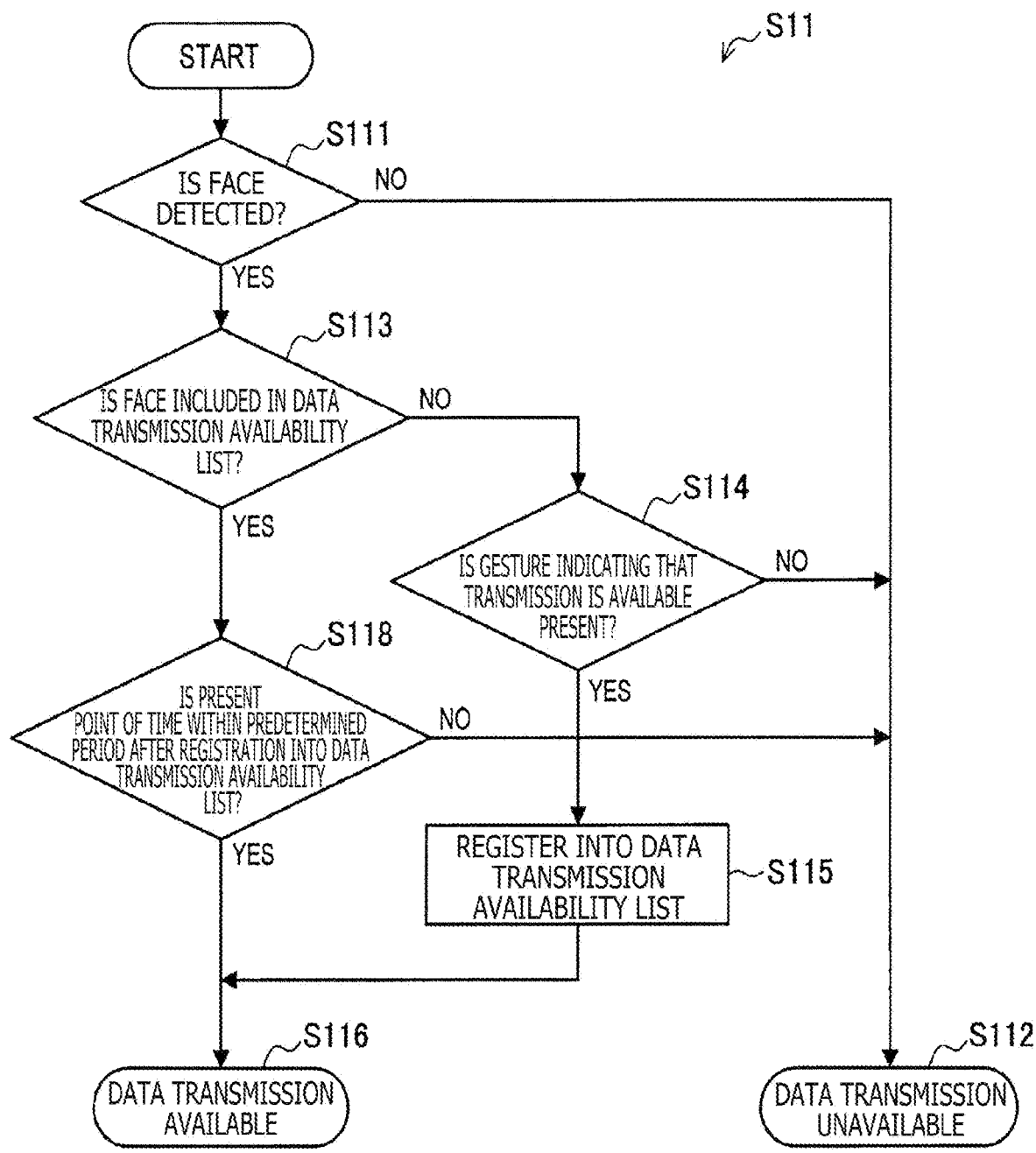
FIG. 11 is a flow chart depicting a detailed operation example of data transmission availability decision according to a modification 1 of the embodiment.

FIG. 11 is a flow chart depicting a detailed operation example of the data transmission availability decision according to the modification 1 of the first embodiment of the present disclosure. As depicted in FIG. 11, different from the example depicted in FIG. 9, in the data transmission availability decision S11, in the case where the detected face is a face included in the data transmission availability list ("YES" at S113), the data transmission decision unit 233 decides whether or not the present point of time is within a predetermined period after the face (feature amount of the face) is registered into the data transmission availability list (S1118). In the case where the present point of time is within the predetermined period after the face (feature amount of the face) is registered into the data transmission availability list ("YES" at S118), the data transmission decision unit 233 decides that data transmission is available (S116). On the other hand, in the case where the present point of time is outside the predetermined period after the face (feature amount of the face) is registered into the data transmission availability list ("NO" at S118), the data transmission decision unit 233 decides that data transmission is not available (S112).

Subsequently, a modification 2 of the first embodiment of the present disclosure is described. The foregoing description is directed to an example in which a gesture (positive gesture) that is used when the imaging target permits imaging of the imaging target itself is used as the first behavior. However, as the first behavior, a gesture (negative gesture) that is used when the imaging target prohibits imaging of the imaging target itself may be used. In other words, when the first behavior is not detected, the storage controlling unit 2332 may extract a first feature amount to have the first feature amount stored into the data transmission availability list storage unit 234.

Figure 12:
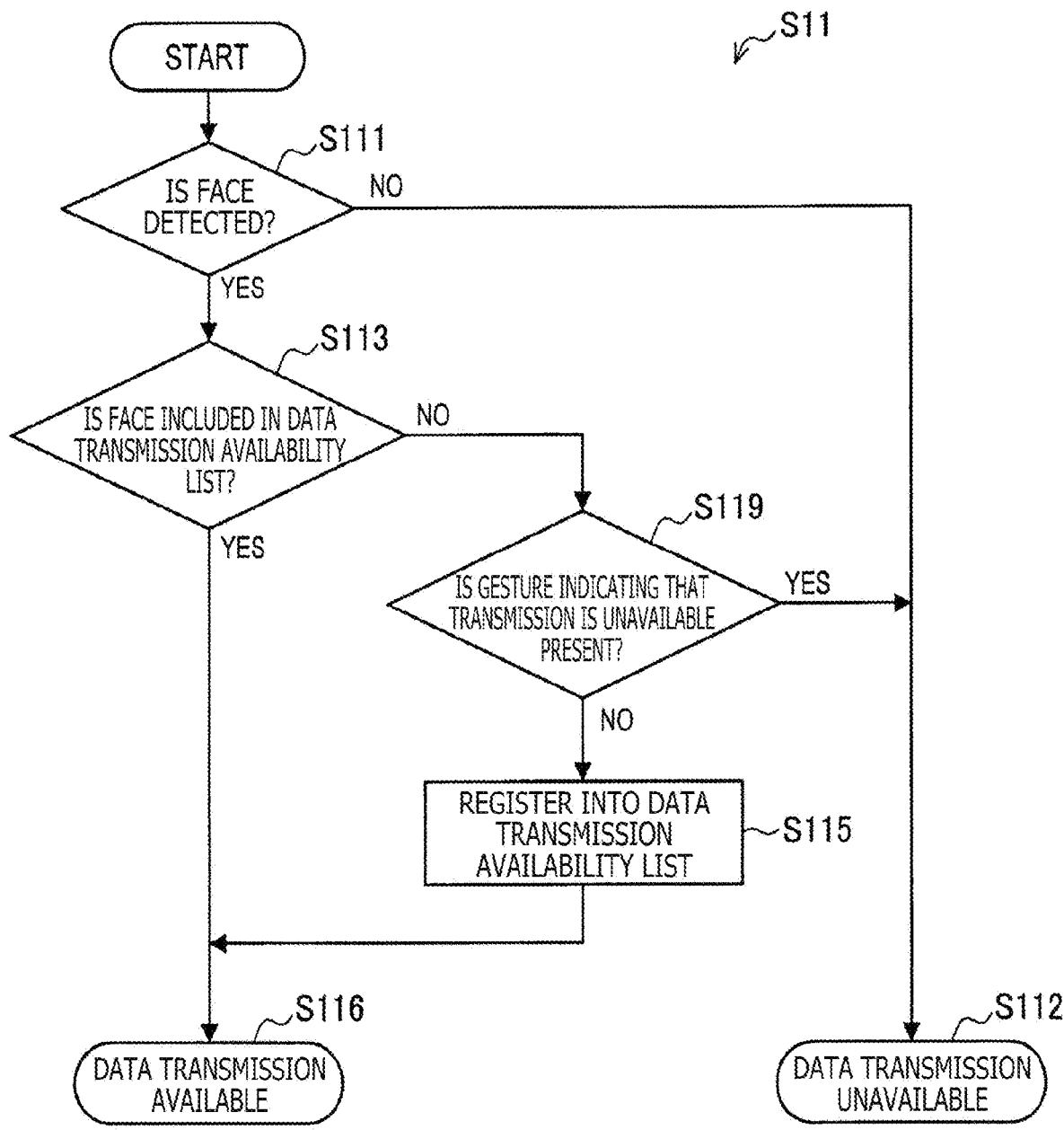
FIG. 12 is a flow chart depicting a detailed operation example of data transmission availability decision according to a modification 2 of the embodiment.

FIG. 12 is a flow chart depicting a detailed operation example of the data transmission availability decision according to the modification 2 of the first embodiment of the present disclosure. As depicted in FIG. 12, different from the example depicted in FIG. 9, in the case where the detected face is a face that is not included in the data transmission availability list ("NO" at S113) in the data transmission availability decision S11, the data transmission decision unit 233 decides whether or not the inputted captured image includes a gesture indicating that transmission is unavailable (S119). The gesture indicating that transmission is unavailable corresponds to an example of the negative gesture described above.

Figure 13:
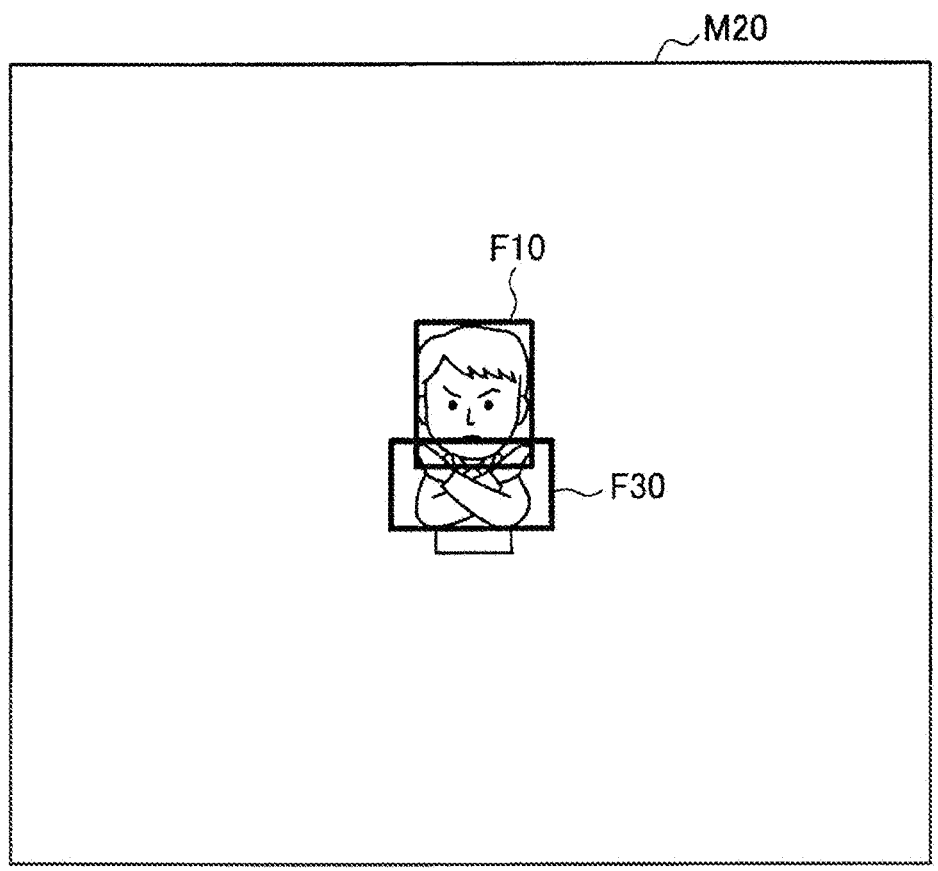
FIG. 13 is a view depicting an example of a gesture indicating that transmission is unavailable.

FIG. 13 is a view depicting an example of a gesture indicating that transmission is unavailable. Referring to FIG. 13, an inputted captured image M20 is depicted. In the captured image M20, a face F10 and a gesture F30 indicating that transmission is unavailable are imaged. In such a case as just described, the face F10 is detected from the captured image M20, and in the case where the face F10 is not found in the data transmission availability list, it is decided that there is a gesture F30 indicating that transmission is unavailable from the captured image M20. It is to be noted that, although FIG. 13 depicts a gesture of crossing the arms as an example of the gesture F30 indicating that transmission is unavailable, the gesture F30 indicating that transmission is unavailable is not limited to such an example.

Description is continued referring back to FIG. 12. In the case where the data transmission decision unit 233 decides that the inputted captured image includes a gesture indicating that transmission is unavailable ("YES" at S119), the data transmission decision unit 233 decides that data transmission is unavailable (S112). On the other hand, in the case where the data transmission decision unit 233 decides that the inputted captured image does not include a gesture indicating that transmission is unavailable ("NO" at S119), the data transmission decision unit 233 registers the detected face (feature amount of the face) into the data transmission availability list (S115) and decides that data transmission is available (S116).

Subsequently, a modification 3 of the first embodiment of the present disclosure is described. The foregoing description is directed to an example in which, after transmission of a second captured image or data based on the second captured image is started, transmission is continued irrespective of a behavior of the imaging target. However, in the case where the data transmission decision unit 233 detects a second behavior of the imaging target from the second captured image, the data transmission decision unit 233 may stop transmission of the second captured image or data based on the second captured image. For example, the second behavior may be a behavior indicating that the imaging target is not aware of itself being imaged. If so, in the case where the imaging target is not aware of itself being imaged, data obtained by imaging of the imaging target is prevented from being transmitted to the outside of the image sensor 20, and therefore, the privacy protection of the imaging target is enhanced.

Here, it is desirable that the data transmission decision unit 233 detects the second behavior by using a recurrent neural network RNN. If so, a behavior of the imaging target can be recognized not from the second captured image only, but from both the second captured image and a captured image inputted prior to the second captured image. Therefore, it is expected that the behavior indicating that the imaging target is not aware of itself being imaged is recognized with a higher degree of accuracy.

Figure 14:
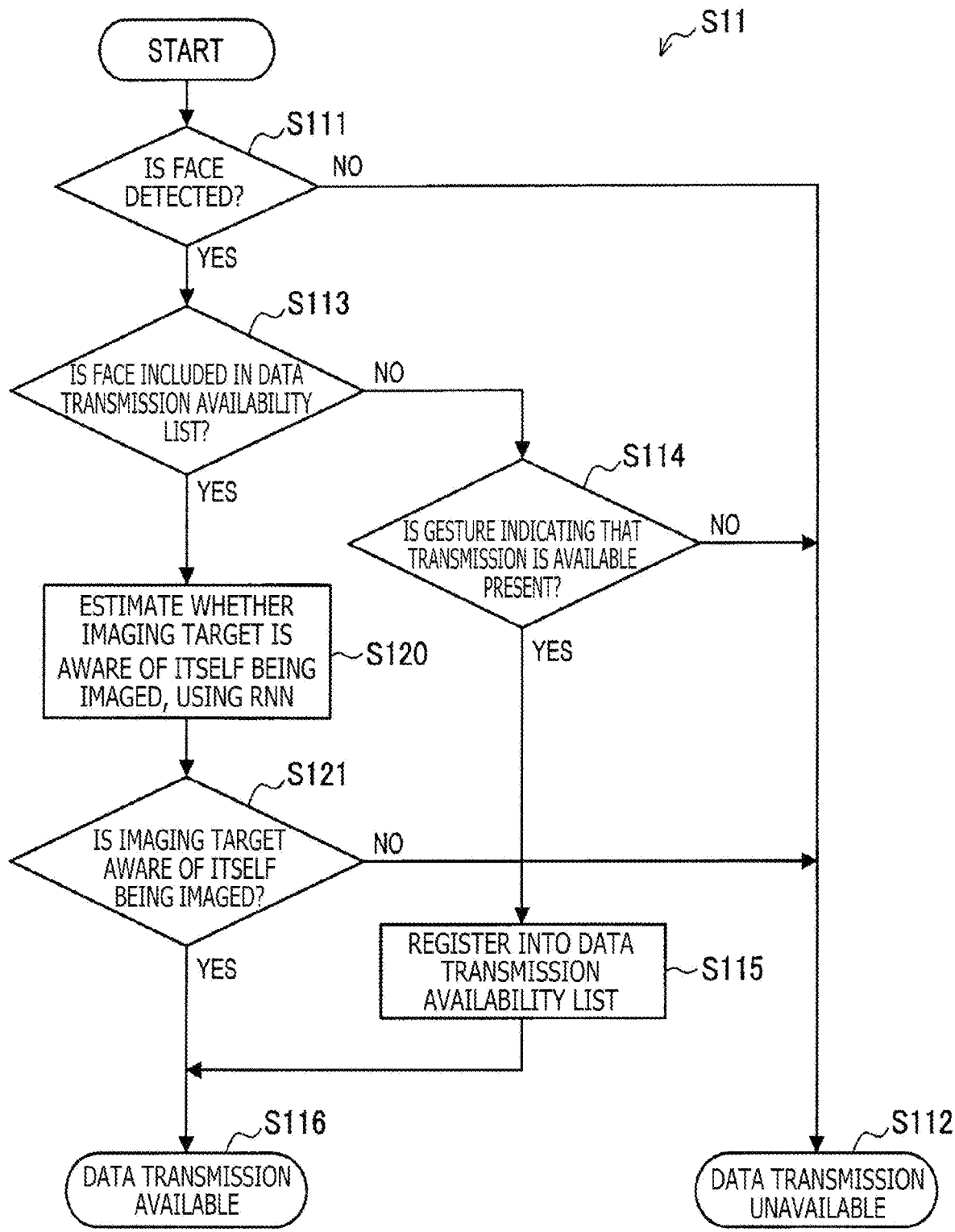
FIG. 14 is a flow chart depicting a detailed operation example of data transmission availability decision according to a modification 3 of the embodiment.

FIG. 14 is a flow chart depicting a detailed operation example of the data transmission availability decision according to the modification 3 of the first embodiment of the present disclosure. As depicted in FIG. 14, different from the example depicted in FIG. 9, in the data transmission availability decision S11, in the case where the detected face is a face included in the data transmission availability list ("YES" at 113), the data transmission decision unit 233 estimates whether or not the imaging target is aware of itself being imaged, by using an RNN (S120). In the case where the data transmission decision unit 233 decides that the imaging target is not aware of itself being imaged ("NO" at S121), the data transmission decision unit 233 decides that data transmission is unavailable (S112). On the other hand, in the case where the data transmission decision unit 233 decides that the imaging target is aware of itself being imaged ("YES" at S121), the data transmission decision unit 233 decides that data transmission is available (S116).

Subsequently, a modification 4 of the first embodiment of the present disclosure is described. In the foregoing description, an example is indicated in the modification 3 in which, in the case where a face (feature amount of a face) is detected from a captured image ("YES" at S111), it is decided whether or not the detected face is a face included in the data transmission list. However, whether or not the detected face is a face included in the data transmission list may not be decided.

Figure 15:
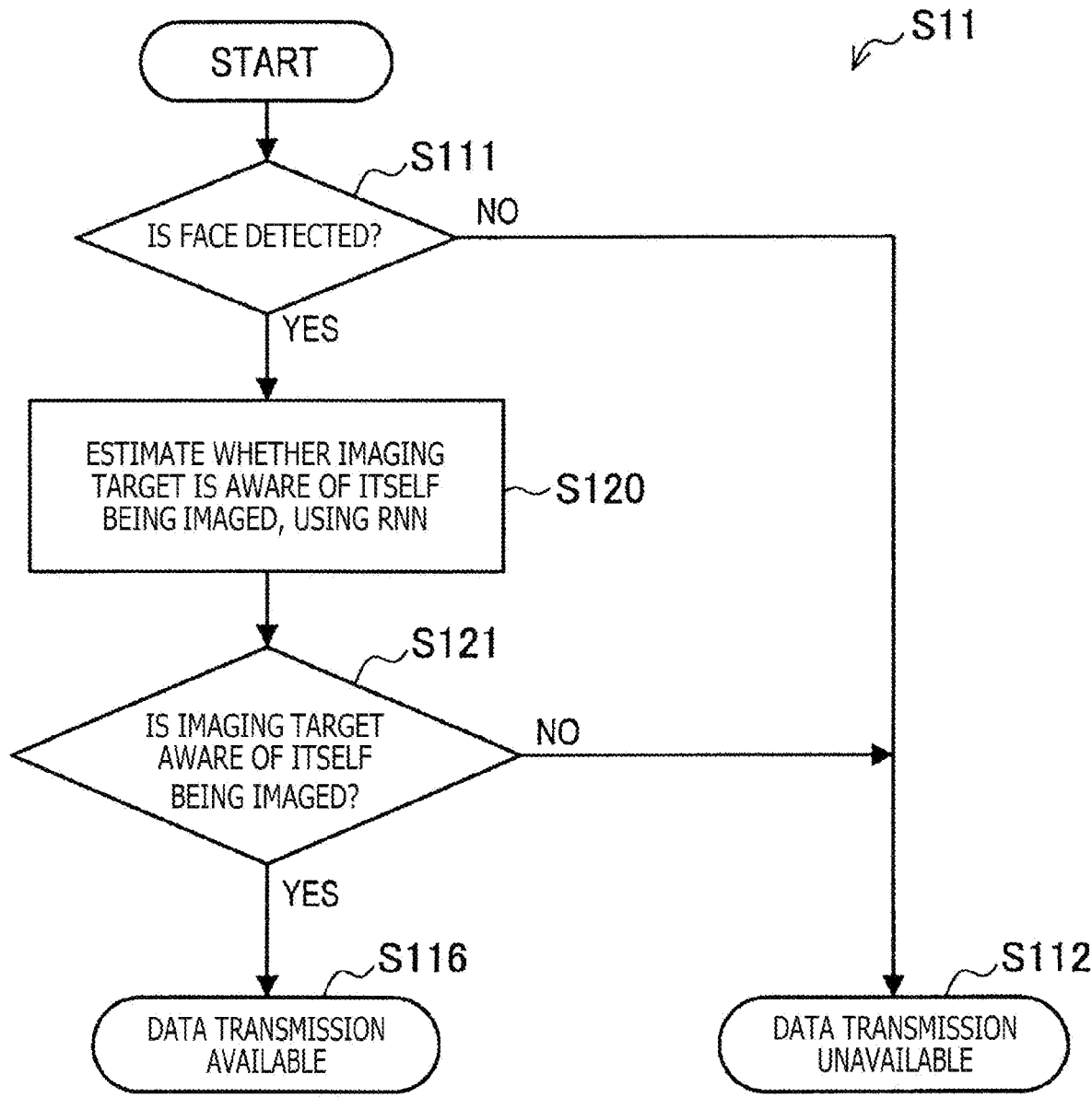
FIG. 15 is a flow chart depicting a detailed operation example of data transmission availability decision according to a modification 4 of the embodiment.

FIG. 15 is a flow chart depicting a detailed operation example of the data transmission availability decision according to the modification 4 of the first embodiment of the present disclosure. As depicted in FIG. 15, different from the example depicted in FIG. 14, in the data transmission availability decision S11, in the case where a face (feature amount of a face) is detected ("YES" at S111), the data transmission decision unit 233 estimates whether or not the imaging target is aware of itself being imaged, by using an RNN (S120). In the case where the data transmission decision unit 233 decides that the imaging target is not aware of itself being imaged ("NO" at S121), the data transmission decision unit 233 decides that data transmission is unavailable (S112). On the other hand, in the case where the data transmission decision unit 233 decides that the imaging target is aware of itself being imaged ("YES" at S121), the data transmission decision unit 233 decides that data transmission is available (S116).

The first embodiment of the present disclosure is such as described above.

1.4. Second Embodiment

Figure 16:
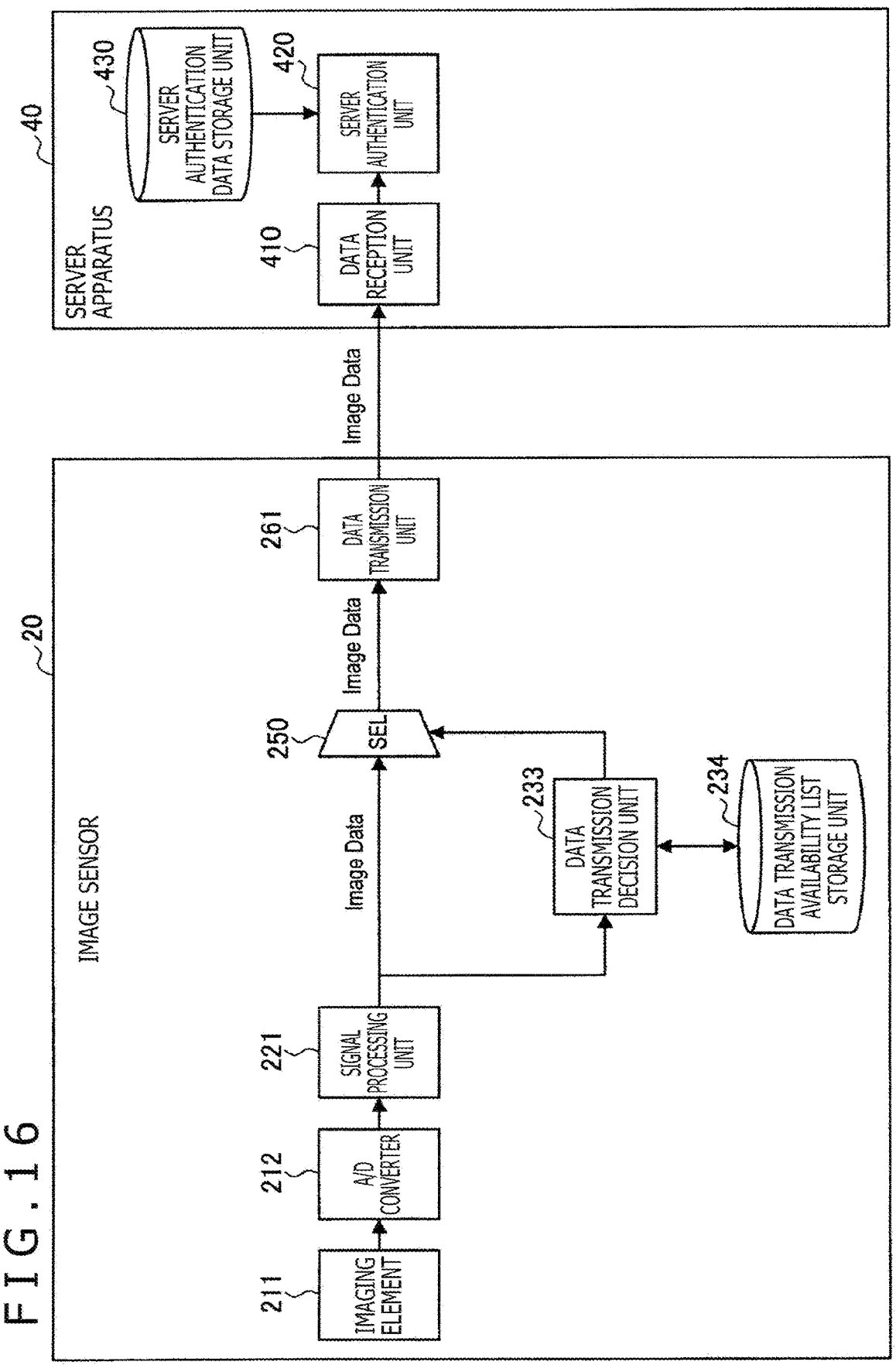
FIG. 16 is a view depicting a detailed configuration example of a solid-state imaging system according to a second embodiment of the present disclosure.

Subsequently, a second embodiment of the present disclosure is described. A detailed configuration of a solid-state imaging system 1 according to the second embodiment of the present disclosure is described. FIG. 16 is a view depicting a detailed configuration example of the solid-state imaging system 1 according to the second embodiment of the present disclosure. As depicted in FIG. 16, the second embodiment of the present disclosure is different from the first embodiment of the present disclosure in that the image sensor 20 does not include the local authentication unit 231 and the local authentication data storage unit 232. In this case, metadata is not transmitted from the image sensor 20 to the server apparatus 40.

Figure 17:
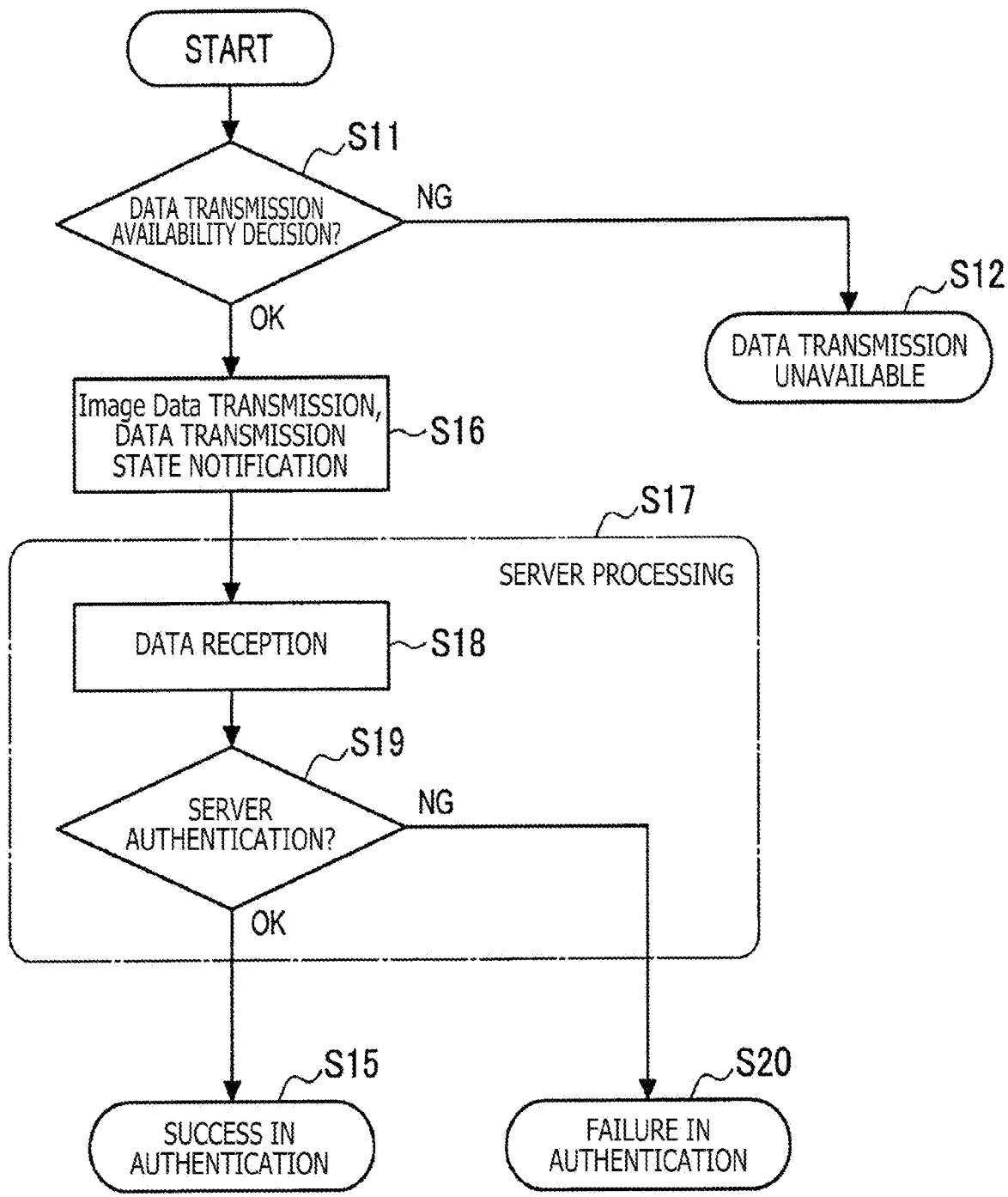
FIG. 17 is a flow chart depicting an operation example of an image sensor according to the embodiment.

Subsequently, an operation example of the image sensor 20 according to the second embodiment of the present disclosure is described. FIG. 17 is a flow chart depicting an operation example of the image sensor 20 according to the second embodiment of the present disclosure. As depicted in FIG. 17, different from the example depicted in FIG. 8, is the case where it is decided that data transmission is available ("OK" at S11), a captured image is transmitted to the server apparatus 40 by the data transmission unit 261. At this time, a notification representing a data transmission state may be issued (S16).

Then, server processing by the server apparatus 40 is performed (S17). In particular, the captured image is received by the data transmission unit 440 (S18), and server authentication is performed on the basis of the captured image (S19). The server authentication can correspond to the second authentication described above. In the case where the server authentication results in success ("OK" at S19), the authentication results in success (S15). On the other hand, in the case where the server authentication results in failure ("NG" at S19), the authentication results in failure (S20).

The second embodiment of the present disclosure is such as described above.

1.5. Third Embodiment

Figure 18:
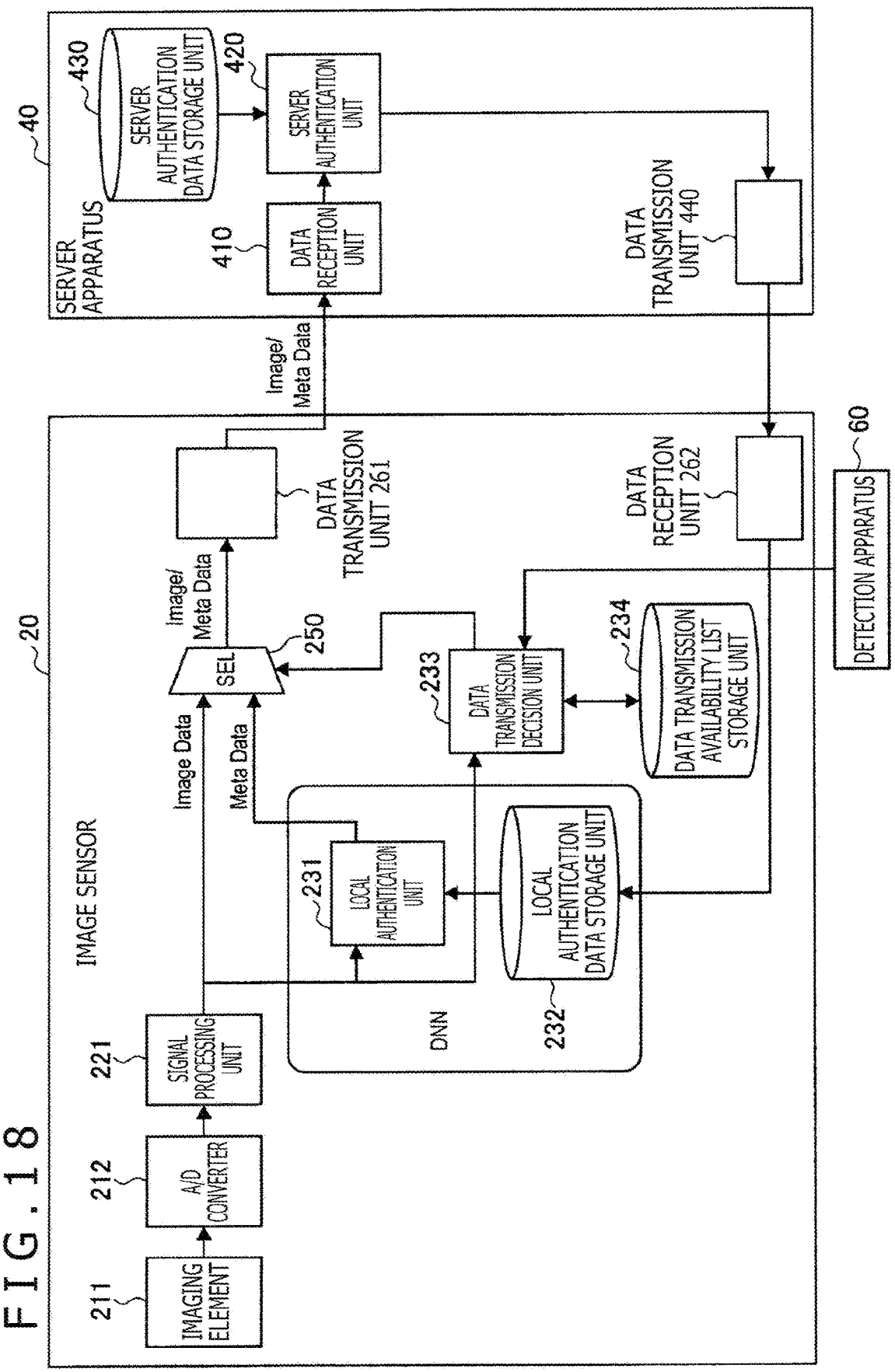
FIG. 18 is a view depicting a detailed configuration example of a solid-state imaging system according to a third embodiment of the present disclosure.

Subsequently, a third embodiment of the present disclosure is described. A detailed configuration of a solid-state imaging system 1 according to the third embodiment of the present disclosure is described. FIG. 18 is a view depicting a detailed configuration example of the solid-state imaging system 1 according to the third embodiment of the present disclosure. As depicted in FIG. 18, the third embodiment of the present disclosure is different from the first embodiment of the present disclosure that the solid-state imaging system 1 includes a detection apparatus 60. In this case, a first behavior can be detected by the detection apparatus 60. For example, in the case where the detection apparatus 60 includes a microphone, as the first behavior, utterance of a predetermined voice may be used in place of a gesture recognized from the captured image. Alternatively, in the case where the detection apparatus 60 includes an inputting device (for example, a touch panel or the like), as the first behavior, a predetermined inputting operation (for example, a touch operation with the touch panel or the like) may be used.

The third embodiment of the present disclosure is such as described above.

1.6. Fourth Embodiment

Figure 19:
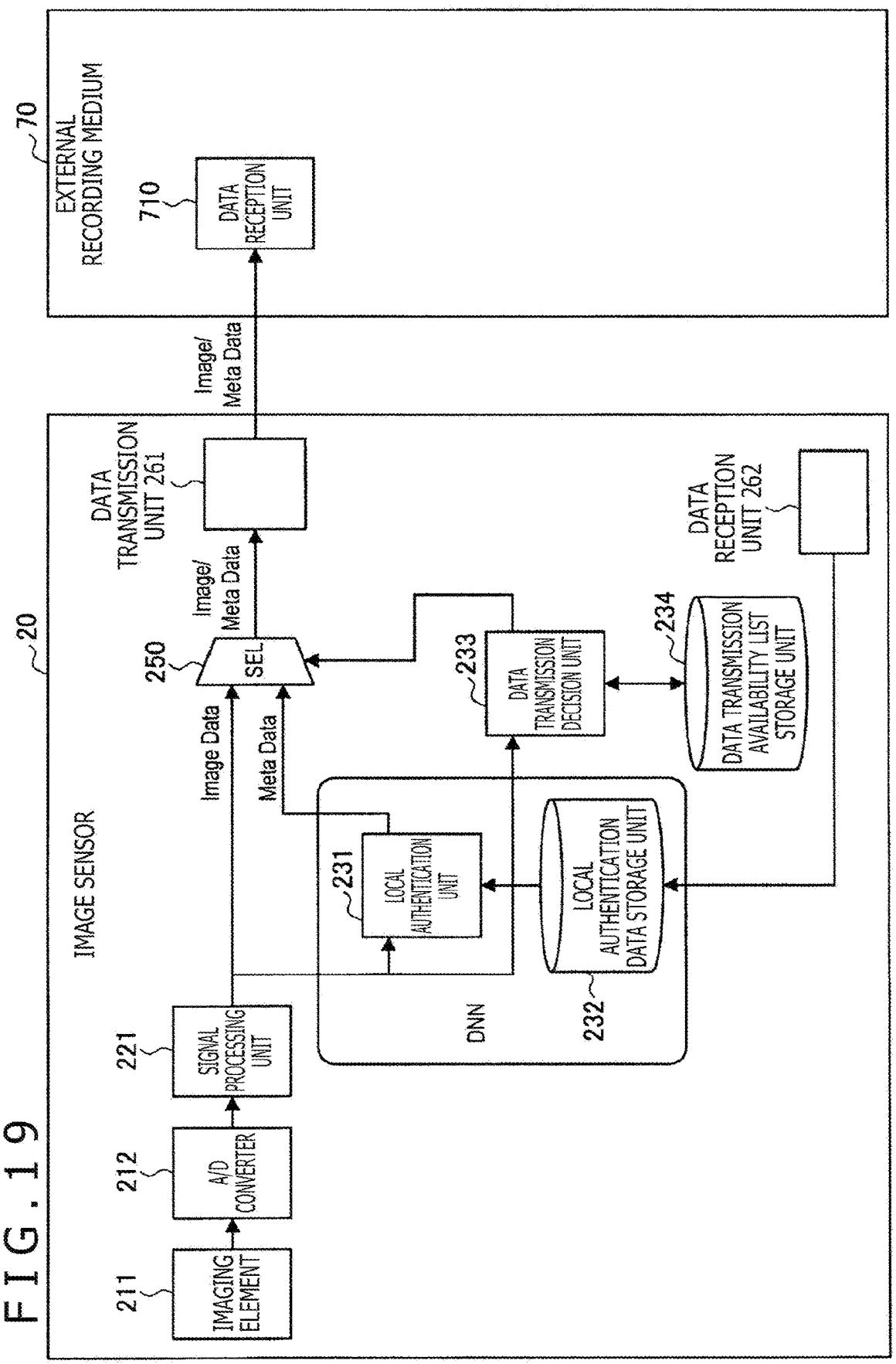
FIG. 19 is a view depicting a detailed configuration example of a solid-state imaging system according to a fourth embodiment of the present disclosure.

Subsequently, a fourth embodiment of the present disclosure is described. A detailed configuration of a solid-state imaging system 1 according to the fourth embodiment of the present disclosure is described. FIG. 19 is a view depicting a detailed configuration example of the solid-state imaging system 1 according to the fourth embodiment of the present disclosure. As depicted in FIG. 19, the fourth embodiment of the present disclosure is different from the first embodiment of the present disclosure in that the solid-state imaging system 1 includes an external recording medium 70 in place of the server apparatus 40. In this case, a second captured image or data (metadata) based on the second captured image transmitted from the image sensor 20 may be recorded in the external recording medium 70. It is to be noted that the second captured image or the data (metadata) based on the second captured image may be outputted from the image sensor 20 to the application 30.

The fourth embodiment of the present disclosure is such as described above.

2. CONCLUSION

As described above, according to the embodiments of the present disclosure, there is provided a solid-state imaging device including an imaging unit configured to capture a first captured image, a storage controlling unit configured to extract, on a basis of information relating to detection of a first behavior of an imaging target from the first captured image, a first feature amount of the imaging target from the first captured image to have the first feature amount stored into a storage unit, and a transmission controlling unit configured to control, when a second feature amount coincident with or similar to the first feature amount is extracted from a second captured image captured by the imaging unit, transmission of the second captured image or data based on the second captured image.

According to such a configuration as just described, since transmission of data obtained by imaging of an imaging target to the outside of the image sensor is controlled, privacy protection of the imaging target can be further enhanced.

Although the preferred embodiments of the present disclosure have been described in detail with reference to the accompanying drawings, the technical scope of the present disclosure is not limited to such embodiments. It is apparent that persons who have common knowledge in the technical field of the present disclosure could conceive various alternations or modifications within the scope of the technical idea described in the claims, and it is construed that also they naturally belong to the technical scope of the present disclosure.

For example, in the foregoing description, the first embodiment of the present disclosure, the modifications 1 to 4 of the first embodiment of the present disclosure, the second embodiment of the present disclosure, the third embodiment of the present disclosure, and the fourth embodiment of the present disclosure have been described. From such various embodiments and modifications, several configurations may be selectively combined in a suitable manner.

Further, the advantageous effects described in the present specification are explanatory or illustrative to the last and are not restrictive. In short, the technology according to the present disclosure can achieve, in place of or in addition to the advantageous effects described above, other advantageous effects that are apparent to those skilled in the art from the description of the present specification.

It is to be noted that also such configurations as described below fall within the technical scope of the present disclosure.

(1)
A solid-state imaging device including:
an imaging unit configured to capture a first captured image;
a storage controlling unit configured to extract, on a basis of information relating to detection of a first behavior of an imaging target from the first captured image, a first feature amount of the imaging target from the first captured image to have the first feature amount stored into a storage unit; and
a transmission controlling unit configured to control, when a second feature amount coincident with or similar to the first feature amount is extracted from a second captured image captured by the imaging unit, transmission of the second captured image or data based on the second captured image.

(2)
The solid-state imaging device according to (1) above, further including:
a first authentication unit configured to perform, in a case where the second feature amount is extracted from the second captured image, first authentication on a basis of the second captured image, in which
the transmission controlling unit controls, in a case where the first authentication results in success, transmission of the data based on the second captured image and controls, in a case where the first authentication results in failure, transmission of the second captured image.

(3)
The solid-state imaging device according to (2) above, in which
the first authentication unit includes a first neural network that has undergone machine learning.

(4)
The solid-state imaging device according to (3) above, in which
a second authentication unit including a second neural network that has undergone machine learning exists in a transmission destination of the second captured image, and
in a case where second authentication based on the second captured image by the second authentication unit results in success, the first authentication unit updates a first parameter of the first neural network on a basis of a second parameter of the second neural network.

(5)
The solid-state imaging device according to any one of (2) to (4) above, further including:
multiple semiconductor chips, in which
the first authentication unit is included in a second semiconductor chip different from a first semiconductor chip that includes the imaging unit, among the multiple semiconductor chips.

(6)
The solid-state imaging device according to (5) above, in which
the first authentication unit is implemented by a DSP included in the second semiconductor chip.

(7)
The solid-state imaging device according to (5) or (6) above, further including:
a signal processing unit configured to perform signal processing for an output signal from the imaging unit, in which
the signal processing unit is included in a third semiconductor chip different from the first semiconductor chip and the second semiconductor chip or in the second semiconductor chip, among the multiple semiconductor chips.

(8)
The solid-state imaging device according to any one of (5) to (7) above, in which
the storage unit is included in a third semiconductor chip different from the first semiconductor chip and the second semiconductor chip or in the second semiconductor chip, among the multiple semiconductor chips.

(9)
The solid-state imaging device according to any one of (1) to (8) above, in which,
in a case where an elapsed time period after the first feature amount is stored into the storage unit exceeds a predetermined time period, the transmission controlling unit stops the transmission of the second captured image or the data based on the second captured image.

(10)
The solid-state imaging device according to any one of (1) to (9) above, in which,
in a case where a second behavior of the imaging target is detected from the second captured image, the transmission controlling unit stoops the transmission of the second captured image or the data based on the second captured image.

(11)
The solid-state imaging device according to (10) above, in which
the transmission controlling unit detects the second behavior by using a recurrent neural network.

(12)
The solid-state imaging device according to any one of (1) to (11) above, in which
the first feature amount and the second feature amount are extracted using a third neural network that has undergone machine learning.

(13)
The solid-state imaging device according to any one of (1) to (12) above, in which
the storage controlling unit extracts, when the first behavior is detected, the first feature amount to have the first feature amount stored into the storage unit.

(14)
The solid-state imaging device according to any one of (1) to (12) above, in which
the storage controlling unit extracts, when the first behavior is not detected, the first feature amount to have the first feature amount stored into the storage unit.

(15)
The solid-state imaging device according to any one of (1) to (14) above, in which
the transmission controlling unit controls transmission of the second captured image or the data based on the second captured image to an application, a server apparatus, or an external recording medium.

(16)
The solid-state imaging device according to any one of (2) to (8) above, in which,
in the case where the first authentication results in success, processing based on data obtained by the first authentication is performed.

(17)
The solid-state imaging device according to (16) above, in which the data obtained by the first authentication includes identification information of the imaging target identified from the second captured image.

(18)
The solid-state imaging device according to (4) above, in which,
in the case where the second authentication results in success, processing based on data obtained by the second authentication is performed.

(19)
A solid-state imaging method including:
capturing a first captured image; and
extracting, by a processor, on a basis of information relating to detection of a first behavior of an imaging target from the first captured image, a first feature amount of the imaging target from the first captured image to have the first feature amount stored into a storage unit, and controlling, when a second feature amount coincident with or similar to the first feature amount is extracted from a second captured image, transmission of the second captured image or data based on the second captured image.

(20)
Electronic equipment including:
an application;
an imaging unit configured to capture a first captured image; and
a transmission controlling unit configured to extract, on a basis of information relating to detection of a first behavior of an imaging target from within a first captured image, a first feature amount of the imaging target from the first captured image to have the first feature amount stored into a storage unit, and configured to control, when a second feature amount coincident with or similar to the first feature amount is extracted from a second captured image captured by the imaging unit, transmission of the second captured image or data based on the second captured image to the application.

REFERENCE SIGNS LIST

1: Solid-state imaging system
10: Electronic equipment
20: Image sensor
210: CIS
211: Imaging element
212: A/D converter
220: Logic circuit
221: Signal processing unit
2211: Shading correction unit
2212: Color mixture correction unit
2213: Digital gain adjustment unit
2214: White balance gain adjustment unit
2215: Wave detection unit
2216: Demosaic processing unit
2217: Gamma correction unit
230: DSP
231: Local authentication unit
2311: Normalization processing unit
2312: Local authentication processing unit
232: Local authentication data storage unit
233: Data transmission decision unit
2331: Transmission controlling unit
2332: Storage controlling unit
234: Data transmission availability list storage unit
240: Memory
250: Selector
261: Data transmission unit
262: Data reception unit
30: Application
40: Server apparatus
410: Data reception unit
420: Serves authentication unit
430: Server authentication data storage unit
440: Data transmission unit
50: Network
60: Detection apparatus
70: External recording medium
L1: First semiconductor chip
L2: Second semiconductor chip
L3: Third semiconductor chip

The invention claimed is:

1. A solid-state imaging device comprising:
an imaging circuitry configured to capture a first captured image and a second captured image,
a memory storing program code, and
a processor configured to execute the program code to perform operations comprising:
detecting an imaging target and a first gesture associated with the imaging target within the first captured image, the first gesture positively indicating permission of transmission of the first captured image that includes the imaging target;
accessing the second captured image; and
controlling transmission of the second captured based on whether the second captured image includes a second gesture indicating restriction of transmission of the imaging target.

2. The solid-state imaging device according to claim 1, wherein the operation further comprising:
performing first authentication on a basis of the second captured image; and
controlling transmission of the second captured image depending upon a success or a failure of the first authentication.

3. The solid-state imaging device according to claim 2, wherein
the first authentication is performed using a first neural network that has undergone machine learning.

4. The solid-state imaging device according to claim 3, wherein the operation further comprise:
receiving a result of a second authentication performed using a second neural network that has undergone machine learning, the second authentication being performed in a transmission destination of the second captured image that is external to the solid-state imaging device, and
in a case where the result of the second authentication indicates success, updating a first parameter of the first neural network on a basis of a second parameter of the second neural network.

5. The solid-state imaging device according to claim 4, wherein, the operations further comprise:
in the case where the second authentication results in success, performing processing based on data obtained by the second authentication.

6. The solid-state imaging device according to claim 2, further comprising:
a first semiconductor chip and a second semiconductor chip, wherein
the first authentication is performed in the second semiconductor chip and the first semiconductor chip includes the imaging circuitry.

7. The solid-state imaging device according to claim 6, wherein
the first authentication is performed by a DSP included in the second semiconductor chip.

8. The solid-state imaging device according to claim 6, wherein the operations further comprise:
performing signal processing for an output signal from the imaging circuitry, wherein
the signal processing is performed in a third semiconductor chip different from the first semiconductor chip and the second semiconductor chip.

9. The solid-state imaging device according to claim 6, wherein
the first captured image and the second captured imager are stored in a memory arranged in a third semiconductor chip different from the first semiconductor chip and the second semiconductor chip.

10. The solid-state imaging device according to claim 2, wherein the operations further comprise:
in the case where the first authentication results in success, performing processing based on data obtained by the first authentication.

11. The solid-state imaging device according to claim 10, wherein the data obtained by the first authentication includes identification information of the imaging target identified from the second captured image.

12. The solid-state imaging device according to claim 1, wherein the operations further comprise:
in a case where an elapsed time period after the detection of the first gesture exceeds a predetermined time period, stopping transmission of the second captured image.

13. The solid-state imaging device according to claim 1, wherein the operations further comprise:
in a case where the second gesture is detected from the second captured image, stopping transmission of the second captured image.

14. The solid-state imaging device according to claim 13, wherein the operations further comprise:
detecting the second behavior using a recurrent neural network.

15. The solid-state imaging device according to claim 1, wherein the first feature amount and the second feature amount are extracted using a third neural network that has undergone machine learning.

16. The solid-state imaging device according to claim 1, wherein the operations further comprise:
transmitting the second captured image to a computer application, a server apparatus, or an external recording medium.

17. Electronic equipment comprising the solid-state imaging device according to claim 1.

18. A solid-state imaging method comprising:
capturing a first captured image and a second captured image;
detecting an imaging target and a first gesture associated with the imaging target within the first captured image, the first gesture positively indicating permission of transmission of the first captured image that includes the imaging target;
accessing the second captured image; and
controlling transmission of the second captured image based on whether the second captured image includes a second gesture indicating restriction of transmission of the imaging target.

19. A non-transitory computer readable medium storing program code for controlling a solid-state imaging device, the program code being executable by a processor to perform operations comprising:
capturing a first captured image and a second captured image;
detecting an imaging target and a first gesture associated with the imaging target within the first captured image, the first gesture positively indicating permission of transmission of the first captured image that includes the imaging target;
accessing the second captured image; and
controlling transmission of the second captured image based on whether the second captured image includes a second gesture indicating restriction of transmission of the imaging target.

\* \* \* \* \*